United States Patent
Kim et al.

(10) Patent No.: US 9,264,996 B2
(45) Date of Patent: *Feb. 16, 2016

(54) ADDRESSING FOR A MULTI-USER PACKET

(71) Applicant: BROADCOM CORPORATION, Irvine, CA (US)

(72) Inventors: Joonsuk Kim, Saratoga, CA (US); Matthew James Fischer, Mountain View, CA (US)

(73) Assignee: BROADCOM CORPORATION, Irvine, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/154,529

(22) Filed: Jan. 14, 2014

(65) Prior Publication Data

US 2014/0126450 A1 May 8, 2014

Related U.S. Application Data

(63) Continuation of application No. 13/023,595, filed on Feb. 9, 2011, now Pat. No. 8,717,957.

(60) Provisional application No. 61/319,366, filed on Mar. 31, 2010, provisional application No. 61/303,162, filed on Feb. 10, 2010.

(51) Int. Cl.
*H04W 52/02* (2009.01)
*H04L 1/00* (2006.01)
*H04L 29/06* (2006.01)
*H04L 5/00* (2006.01)

(52) U.S. Cl.
CPC ............ *H04W 52/0219* (2013.01); *H04L 1/007* (2013.01); *H04L 1/0053* (2013.01); *H04L 1/0071* (2013.01); *H04L 1/0088* (2013.01); *H04L 69/22* (2013.01); *H04W 52/02* (2013.01); *H04W 52/0222* (2013.01); *H04W 52/0229* (2013.01); *H04L 5/0023* (2013.01); *H04L 5/0053* (2013.01); *Y02B 60/50* (2013.01)

(58) Field of Classification Search
CPC ............ H04W 52/02; H04W 52/0219; H04W 52/0222; H04W 52/0229; H04L 1/0053; H04L 1/007; H04L 1/0071; H04L 1/0088; H04L 5/0023; H04L 5/0053; H04L 69/22; Y02B 60/50

See application file for complete search history.

(56) References Cited

U.S. PATENT DOCUMENTS 7,257,095 B2 * 8/2007 Liu .................... H04W 52/0229 370/311
8,064,411 B2 * 11/2011 Ecclesine .......... H04W 52/0235 370/311

(Continued)

*Primary Examiner* — Ian N Moore
*Assistant Examiner* — Sumitra Ganguly
(74) *Attorney, Agent, or Firm* — Garlick & Markison; Bruce E. Stuckman

(57) ABSTRACT

Preamble and header bit allocation for power savings within multiple user, multiple access, and/or MIMO wireless communications. Within a multi-user packet, information (e.g., partial address information) related to a recipient group of wireless communication devices (e.g., as few as one wireless communication device or any subset of a number of wireless communication devices, sometimes including all of the wireless communication devices) is emplaced within a PHY (e.g., physical layer) header of such a multi-user packet to be communicated within a multi-user (MU) environment. Such recipient indicating information can be encoded with relatively higher robustness (e.g., lower coding rates, lower ordered modulation, cyclic redundancy check (CRC), etc.) that remaining portions of the multi-user packet. Various portions of the remainder of the multi-user packet may respectively correspond to different wireless communication devices (e.g., a first field for a first wireless communication device, a second field for a second wireless communication device, etc.).

20 Claims, 28 Drawing Sheets

(56) References Cited

U.S. PATENT DOCUMENTS

| | | | | |
|---|---|---|---|---|
| 2007/0217370 A1* | 9/2007 | Soong | H04B 7/2621 | 370/337 |
| 2008/0228878 A1* | 9/2008 | Wu | H04W 72/121 | 709/205 |
| 2008/0232490 A1* | 9/2008 | Gross | H04W 28/18 | 375/260 |
| 2010/0112974 A1* | 5/2010 | Sahai | H04W 52/0229 | 455/334 |

* cited by examiner

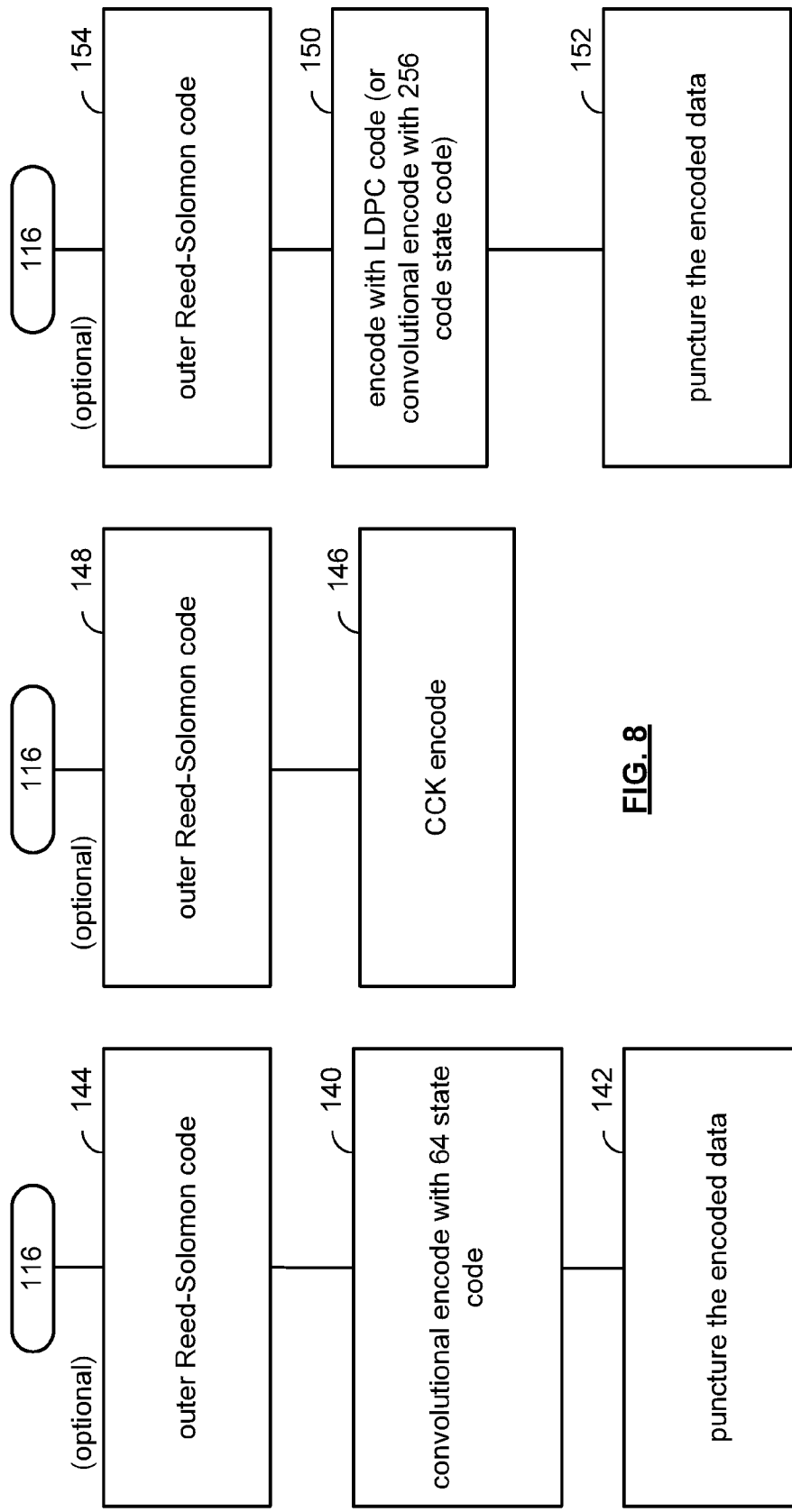

FIG. 17    PHY header duration vs. MAC RA

VHT SIG bit allocation for SU

ADDRESSING FOR A MULTI-USER PACKET

CROSS REFERENCE TO RELATED PATENTS/PATENT APPLICATIONS

The present U.S. Utility patent application claims priority pursuant to 35 U.S.C. §120 as a continuation of U.S. Utility application Ser. No. 13/023,595, entitled PREAMBLE AND HEADER BIT ALLOCATION FOR POWER SAVINGS WITHIN MULTIPLE USER, MULTIPLE ACCESS, AND/OR MIMO WIRELESS COMMUNICATIONS, filed Feb. 9, 2011, issued as U.S. Pat. No. 8,717,957 on May 6, 2014, which claims, which claims priority pursuant to 35 U.S.C. §119(e) to U.S. Provisional Application No. 61/303,162, entitled WLAN NEXT GENERATION HEADER BIT ALLOCATION AND POWER SAVING OPTIONS, filed Feb. 10, 2010, expired, and U.S. Provisional Application No. 61/319,366, entitled EFFICIENT GROUP ID FOR MU-MIMO TRANSMISSIONS IN NEXT GENERATION WLAN, filed Mar. 31, 2010, expired, all of which are hereby incorporated herein by reference in their entirety and made part of the present U.S. Utility patent application for all purposes.

INCORPORATION BY REFERENCE

The following U.S. Utility patent applications are hereby incorporated herein by reference in their entirety and are made part of the present U.S. Utility patent application for all purposes:
1. U.S. Utility patent application Ser. No. 12/794,707, entitled "Cluster parsing for signaling within multiple user, multiple access, and/or MIMO wireless communications," filed on Jun. 4, 2010, pending.
2. U.S. Utility patent application Ser. No. 12/794,711, entitled "Transmission acknowledgement within multiple user, multiple access, and/or MIMO wireless communications," filed on Jun. 4, 2010, issued as U.S. Pat. No. 8,498,359 on Jul. 30, 2013.
3. U.S. Utility patent application Ser. No. 12/796,654, entitled "Channel characterization and training within multiple user, multiple access, and/or MIMO wireless communications," filed on Jun. 8, 2010, issued as U.S. Pat. No. 8,526,351 on Sep. 3, 2013.
4. U.S. Utility patent application Ser. No. 12/796,655, entitled "Group identification and definition within multiple user, multiple access, and/or MIMO wireless communications," filed on Jun. 8, 2010, issued as U.S. Pat. No. 9,197,298 on Nov. 24, 2015.
5. U.S. Utility patent application Ser. No. 12/852,435, entitled "Management frame map directed operational parameters within multiple user, multiple access, and/or MIMO wireless communications," filed on Aug. 6, 2010, issued as U.S. Pat. No. 8,885,535 on Nov. 11, 2014.
6. U.S. Utility patent application Ser. No. 12/949,921, entitled "Group identification and definition employing look up table (LUT) within multiple user, multiple access, and/or MIMO wireless communications," filed on Nov. 19, 2010, issued as U.S. Pat. No. 8,861,447 on Oct. 14, 2014.

INCORPORATION BY REFERENCE

The following IEEE standards are hereby incorporated herein by reference in their entirety and are made part of the present U.S. Utility patent application for all purposes:
1. IEEE Std 802.11™-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1233 pages.
2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11-2007 as amended by IEEE Std 802.11k™-2008, IEEE Std 802.11r™-2008, IEEE Std 802.11y™-2008, and IEEE Std 802.11r™-2009), 536 pages.

BACKGROUND OF THE INVENTION

1. Technical Field of the Invention

The invention relates generally to communication systems; and, more particularly, it relates to preamble and header bit allocation for power savings within multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIGS. 7-9 are diagrams illustrating various embodiments for encoding the scrambled data.

DETAILED DESCRIPTION OF THE INVENTION

Figure 1:
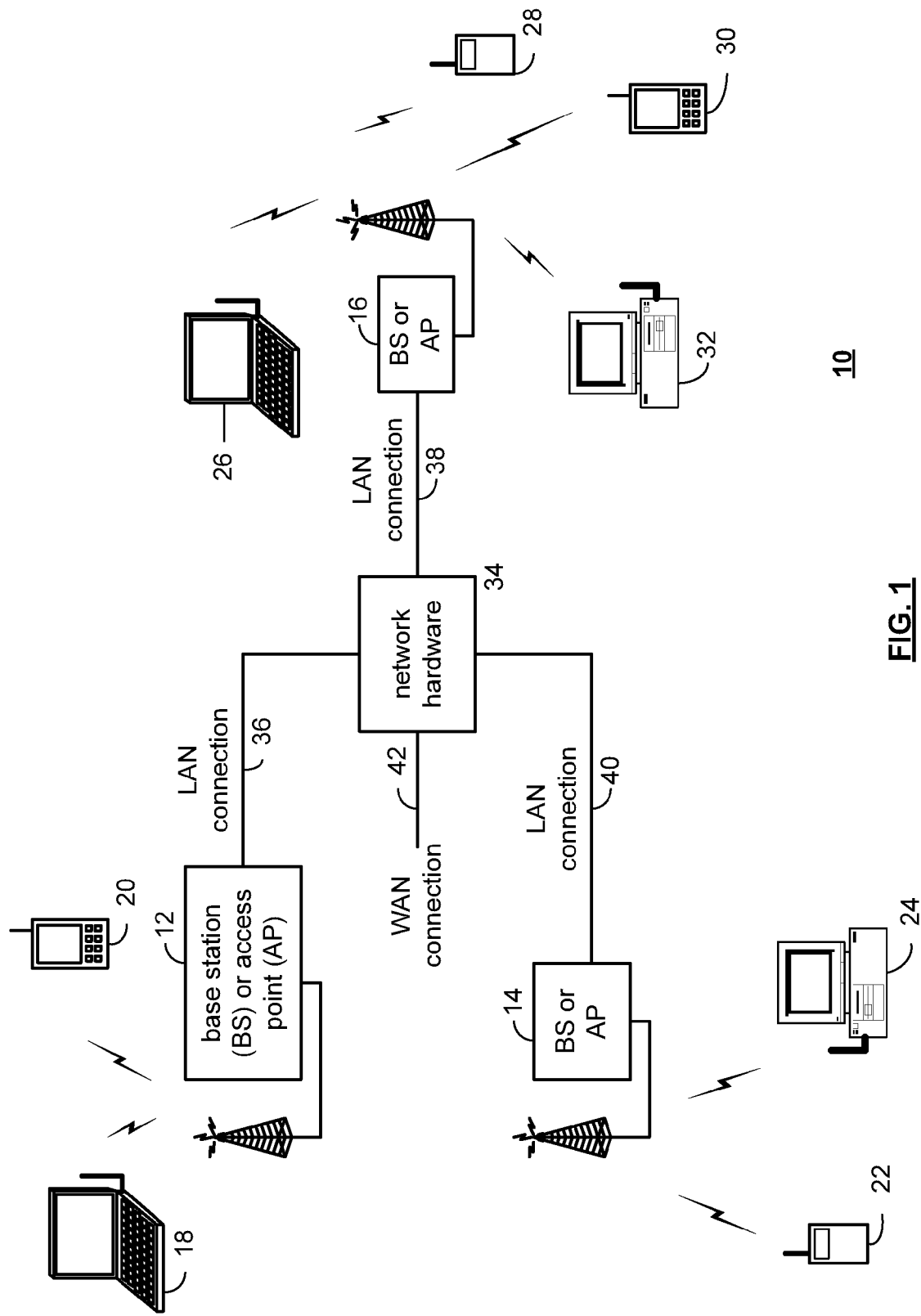
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
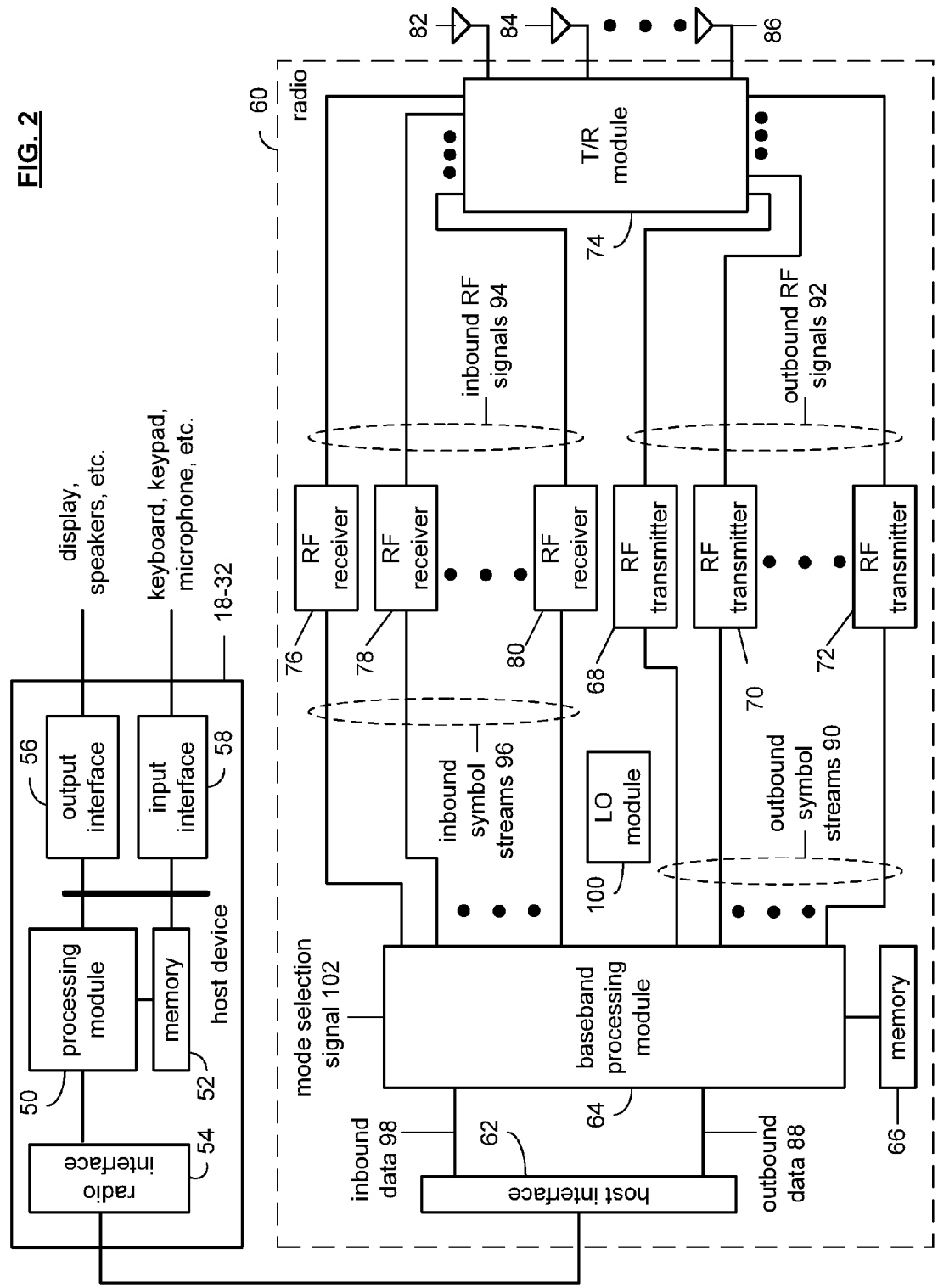
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
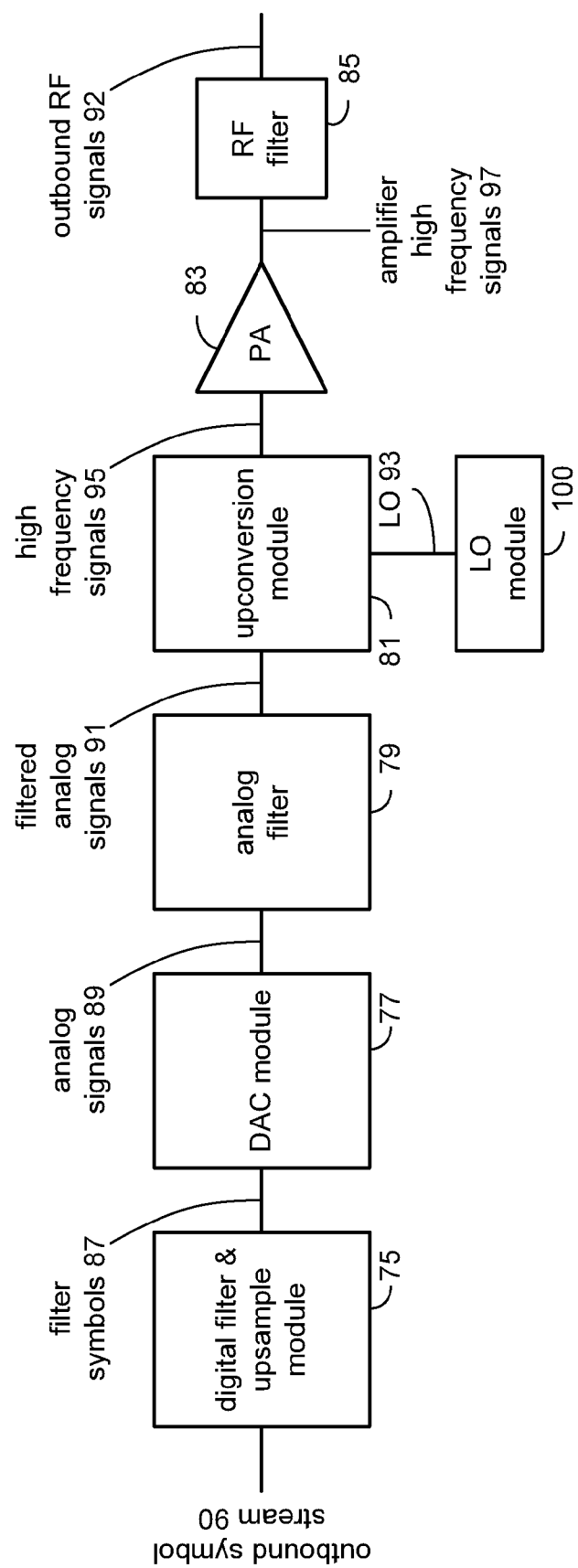
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
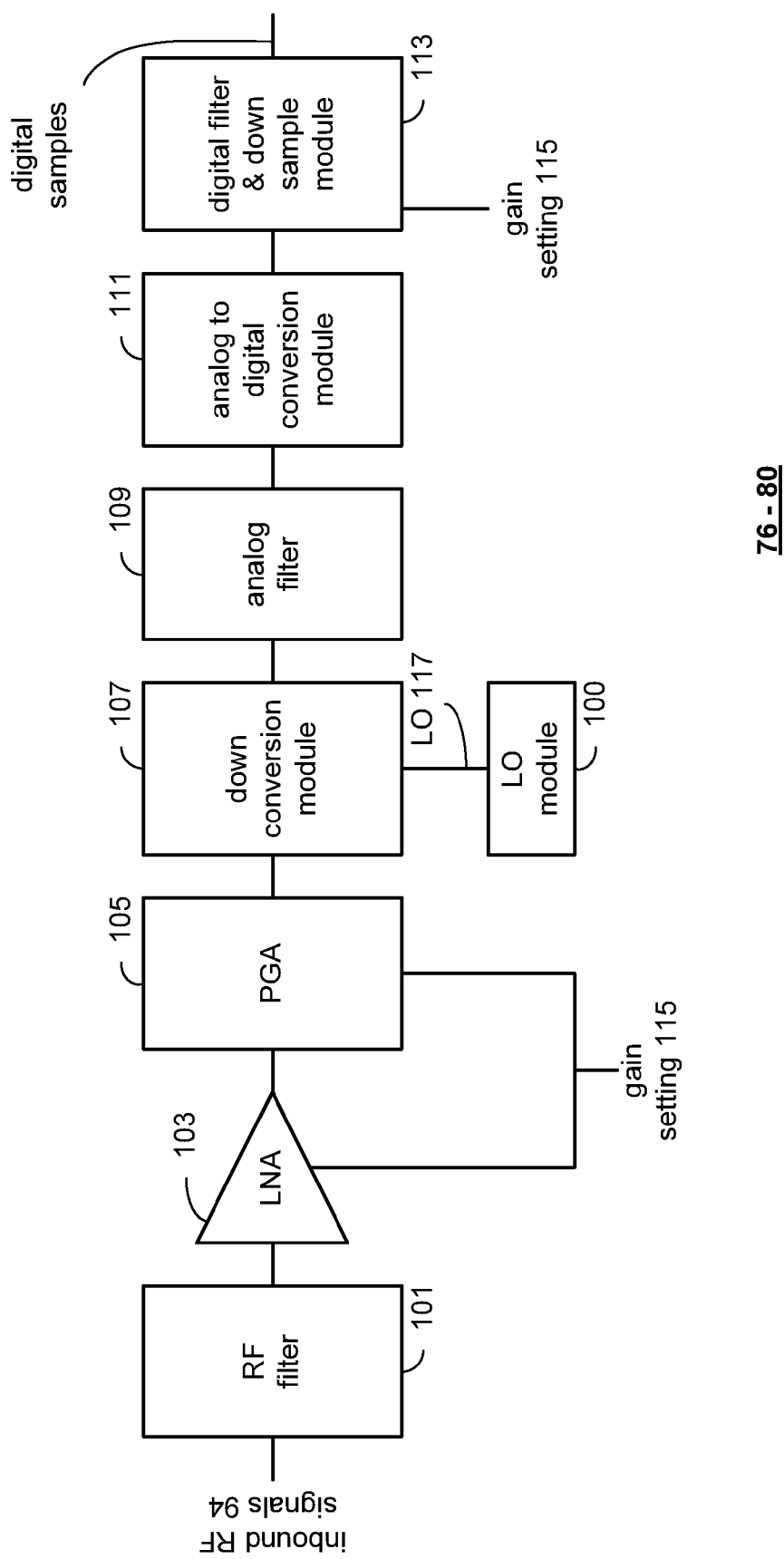
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting 115 and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) 117 that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
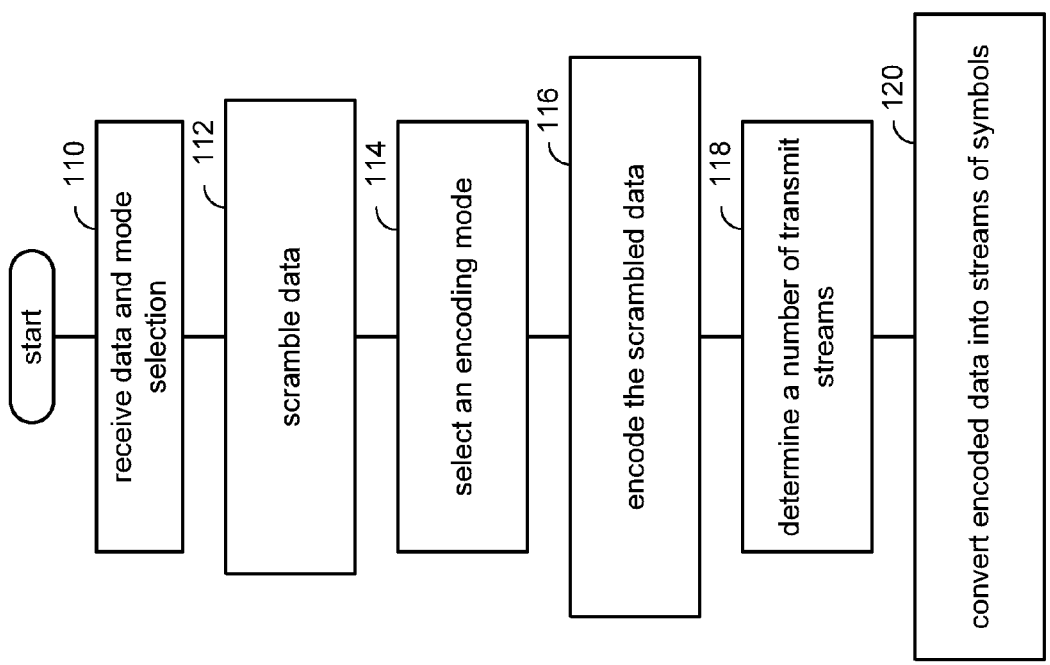
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
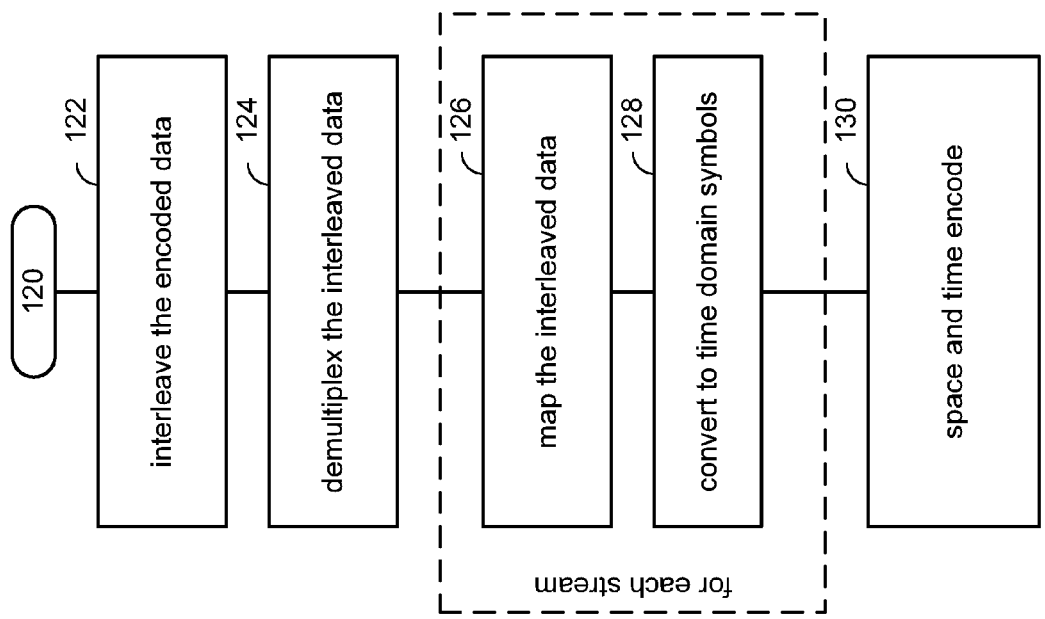
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} c_1 & c_2 & c_3 & c_4 & \Lambda & c_{2M-1} & c_{2M} \\ -c_2^* & c_1^* & -c_4^* & c_3^* & \Lambda & -c_{2M}^* & c_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
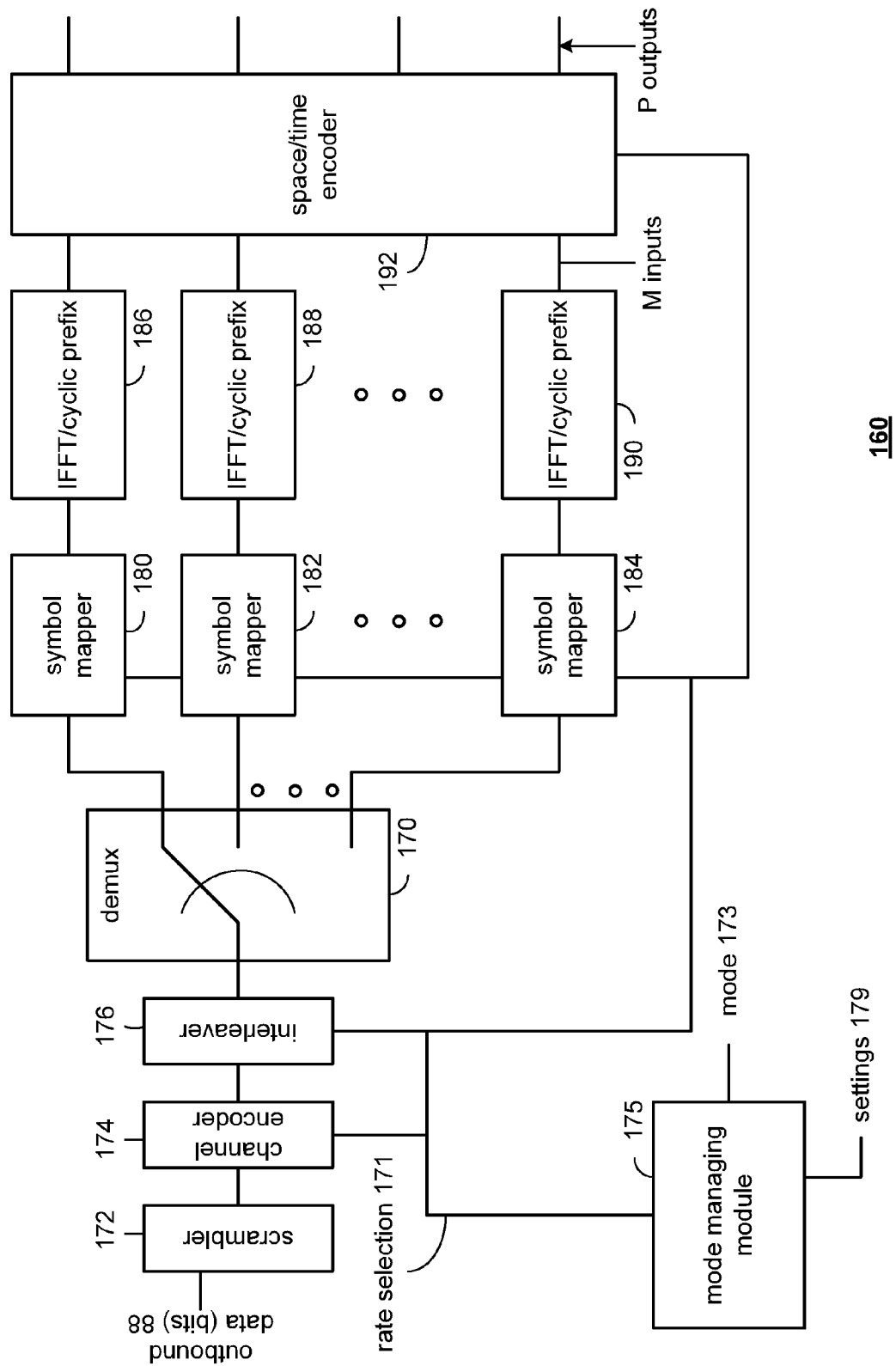
FIGS. 10A and 10B are diagrams illustrating embodiments of a radio transmitter.
Figure 10B:
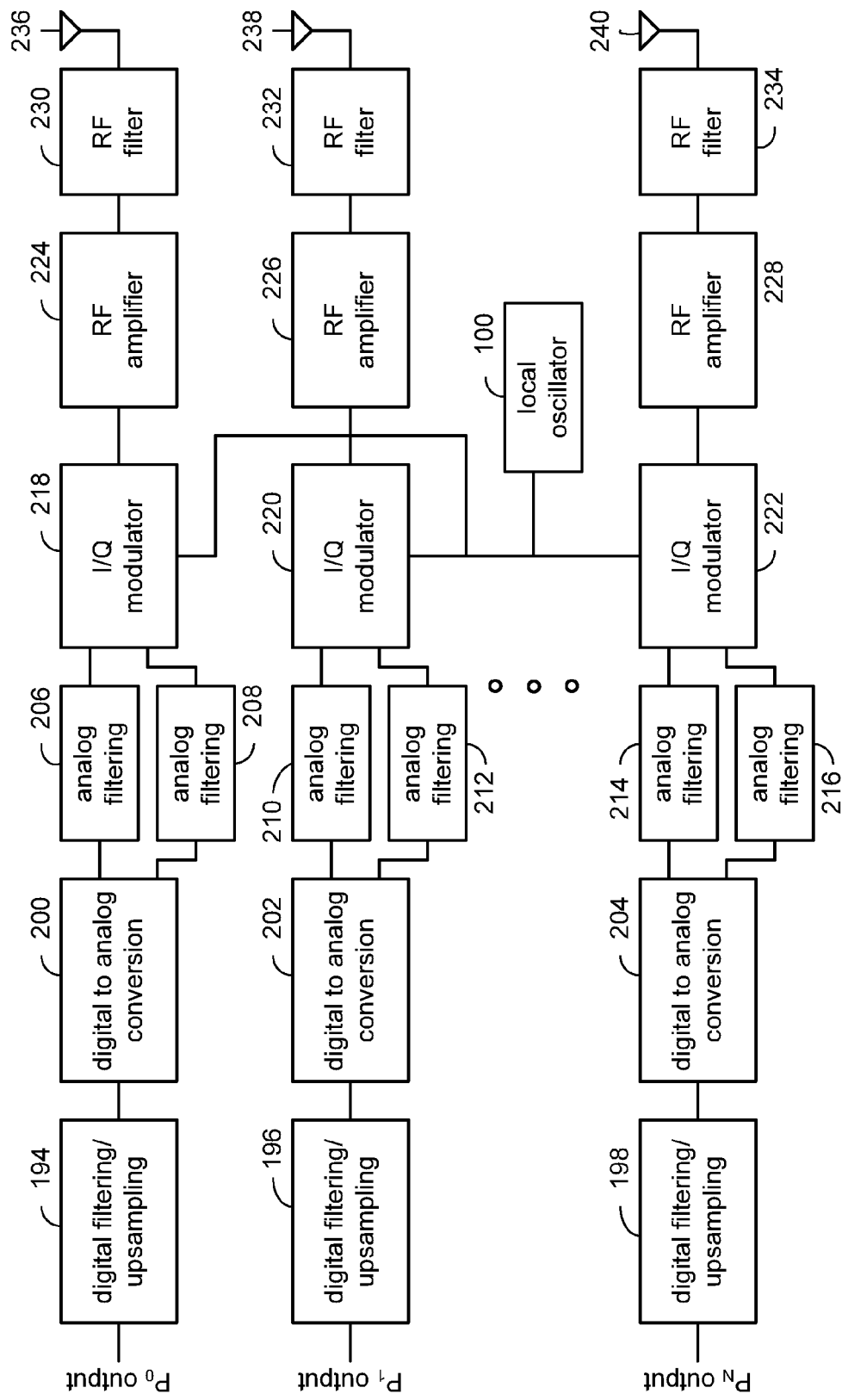

FIGS. 10A and 10B are diagrams illustrating embodiments of a radio transmitter 160. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \wedge & C_{2M-1} & C_{2M} \\ -C_2^* & C_1^* & -C_4^* & C_3^* & \wedge & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
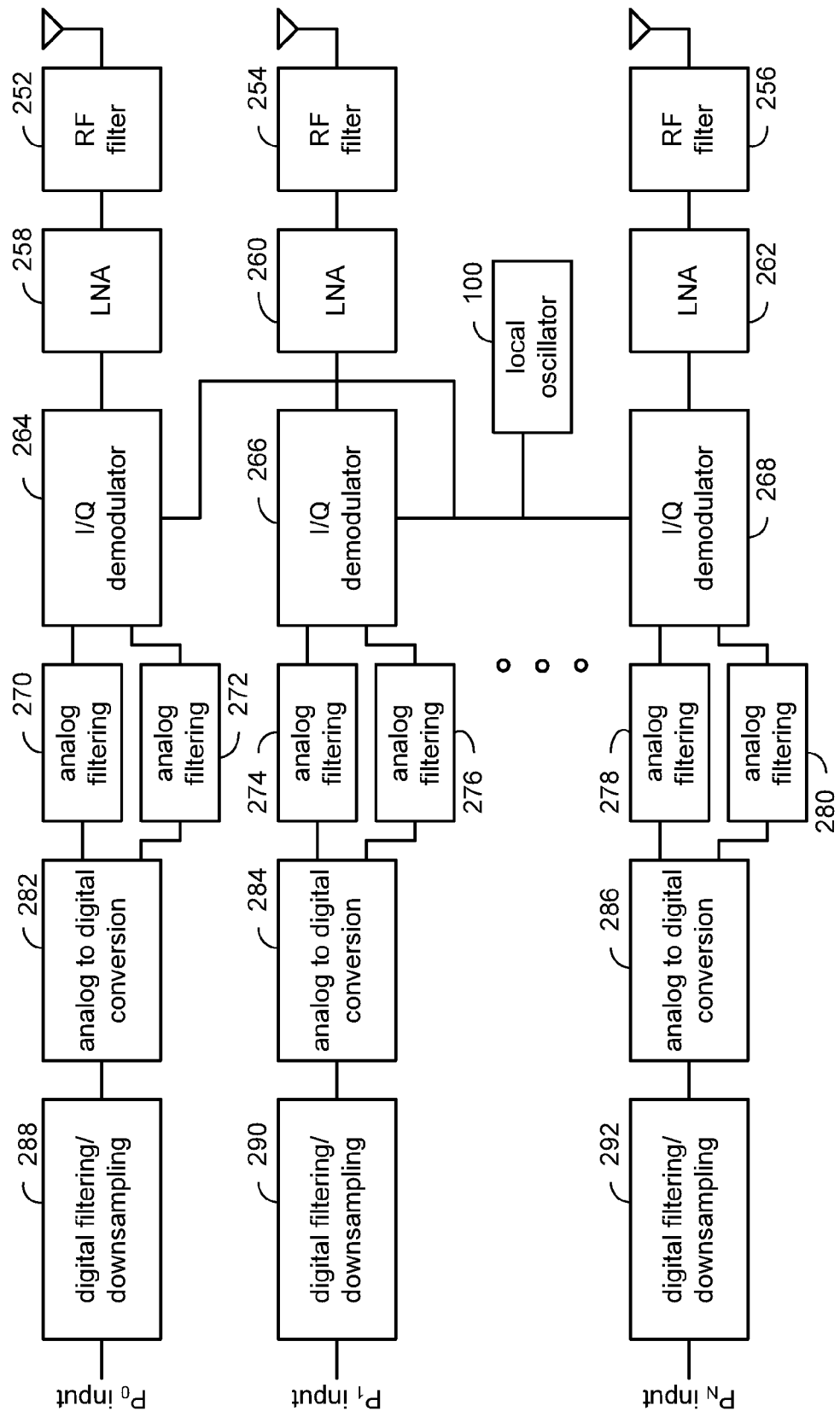
FIGS. 11A and 11B are diagrams illustrating embodiments of a radio receiver.
Figure 11B:
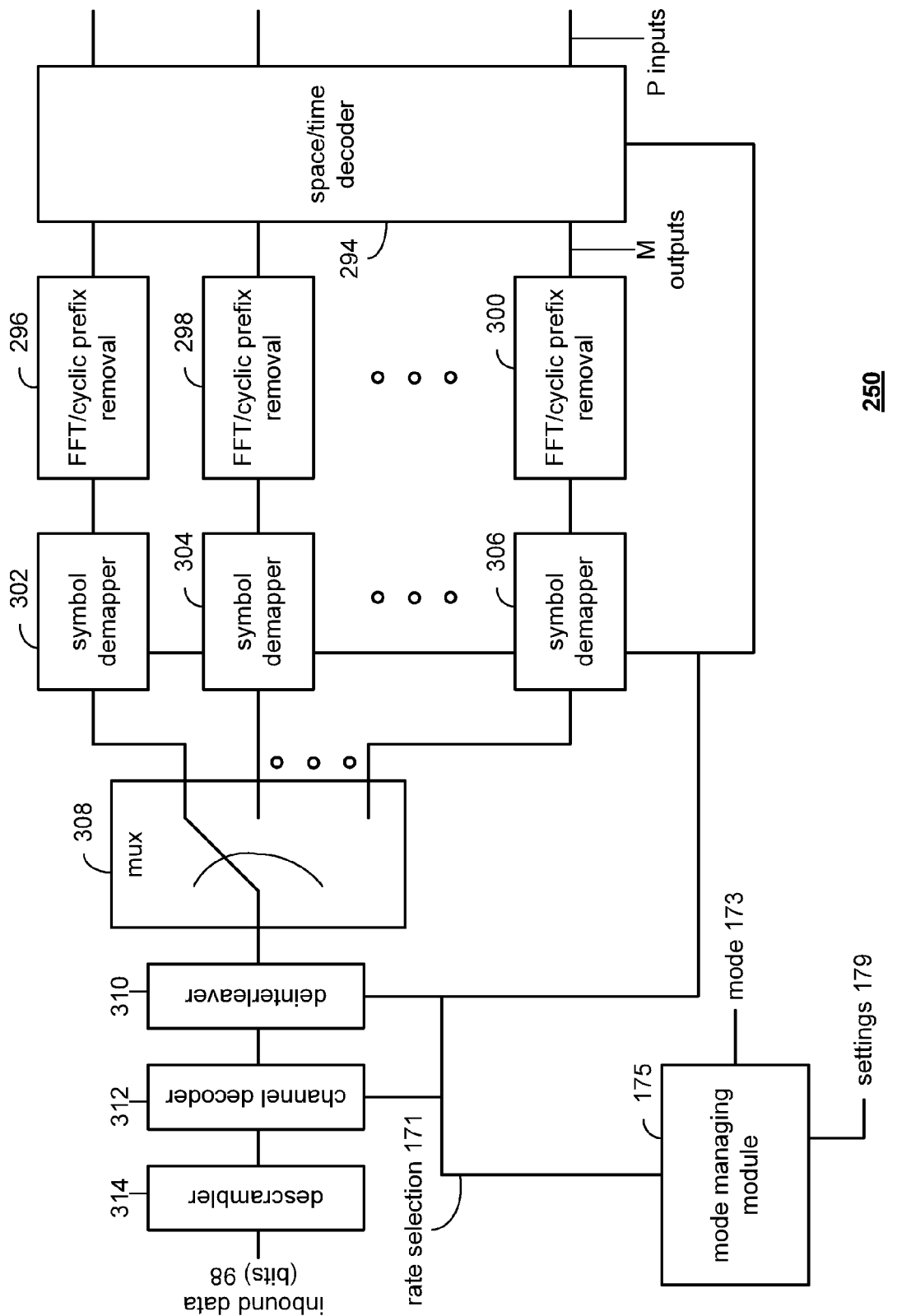

FIGS. 11A and 11B are diagrams illustrating embodiments of a radio receiver 250. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-292.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
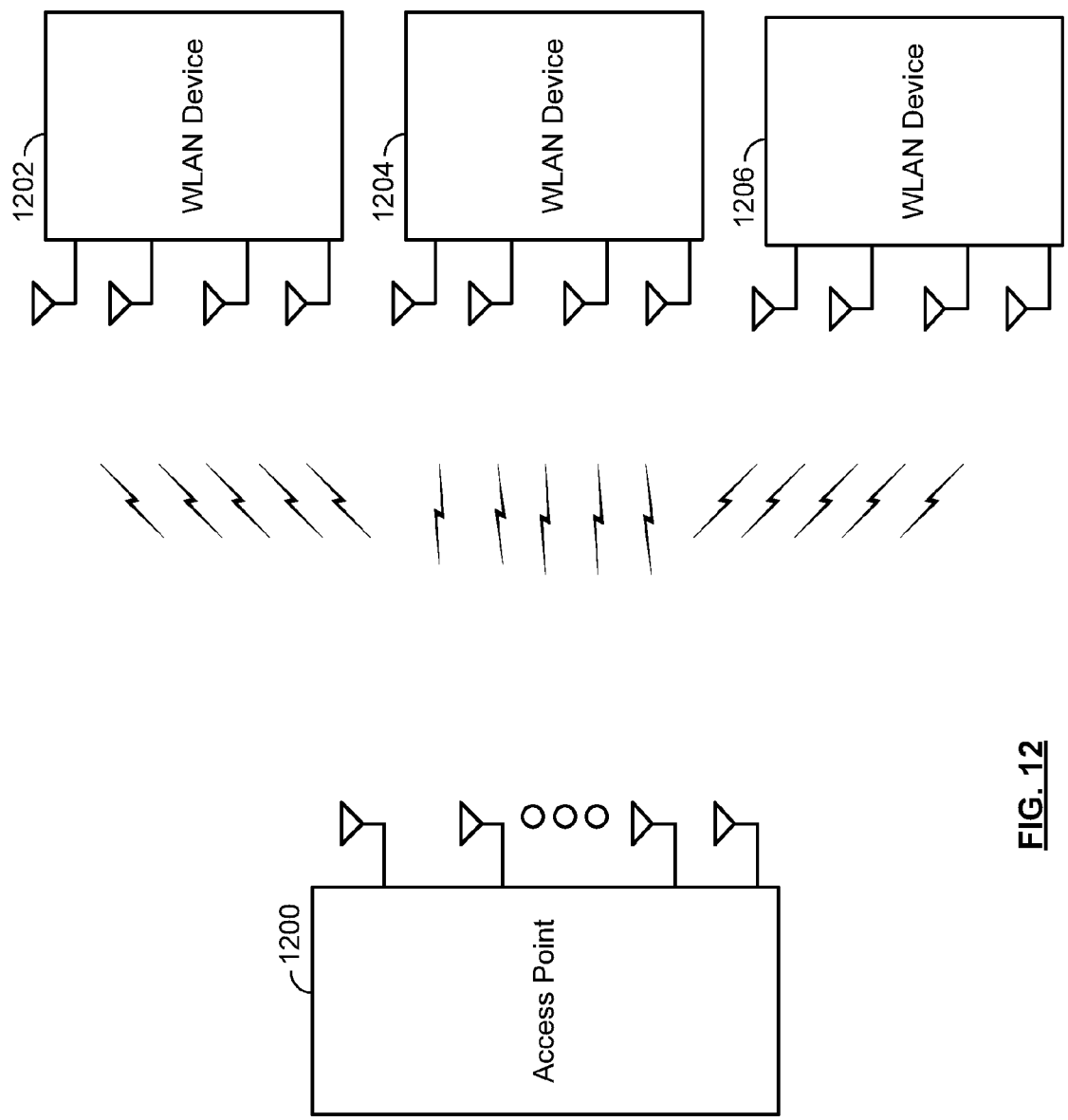
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11(a), (b), (g), and (n) operating standards. In supporting such backwards compatibility, these devices support signal formats and structures that are consistent with these prior operating standards.

Figure 13:
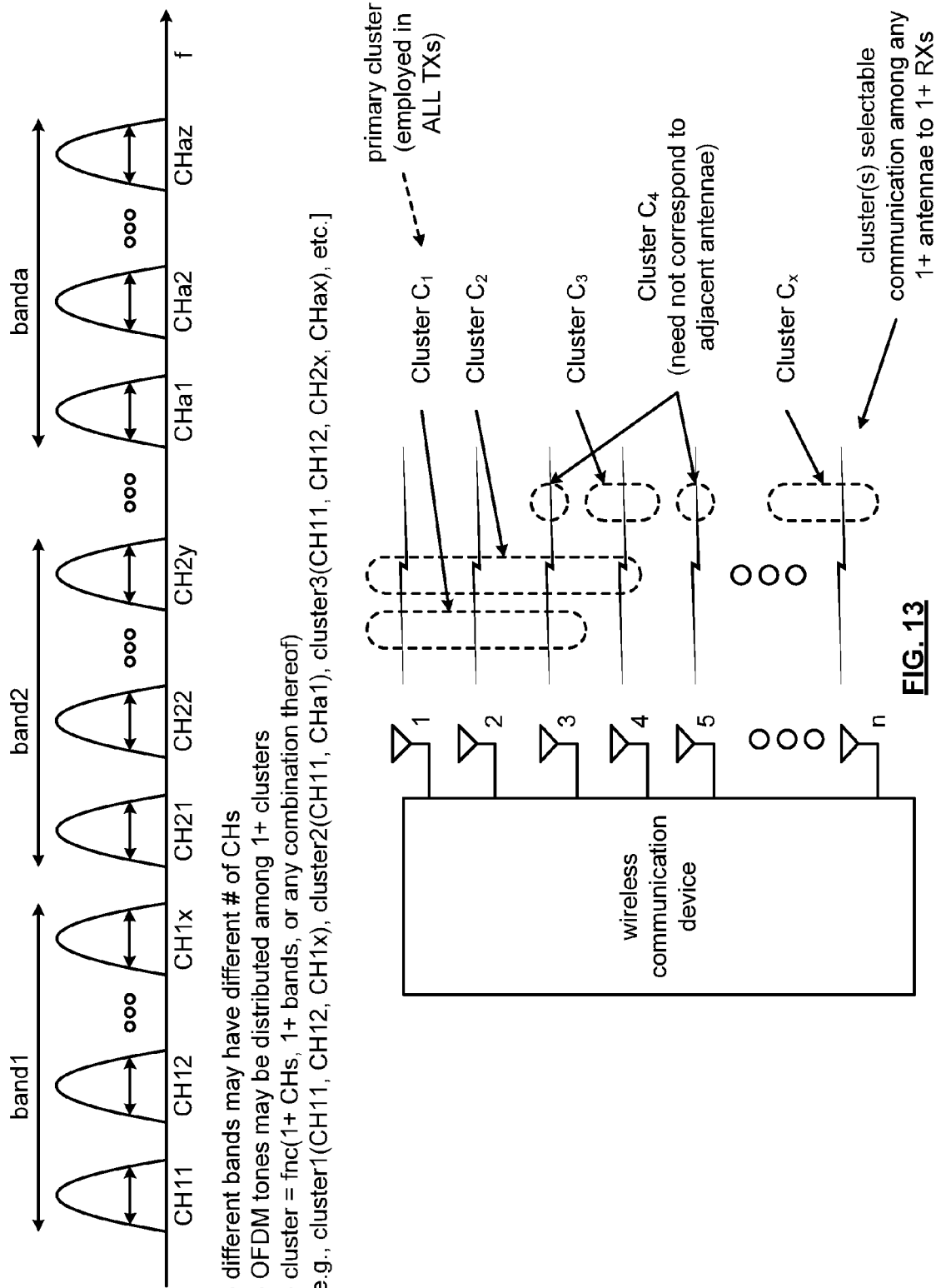
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Within the various diagrams and embodiments described and depicted herein, wireless communication devices may generally be referred to as WDEVs. It is noted that such wireless communication devices may be wireless stations (STAs), access points (APs), or any other type of wireless communication device without departing from the scope and spirit of the invention. Generally speaking, wireless communication devices that are APs may be referred to as transmitting wireless communication devices, and wireless communication devices that are STAs may be referred to as receiving wireless communication devices in certain contexts.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Figure 14:
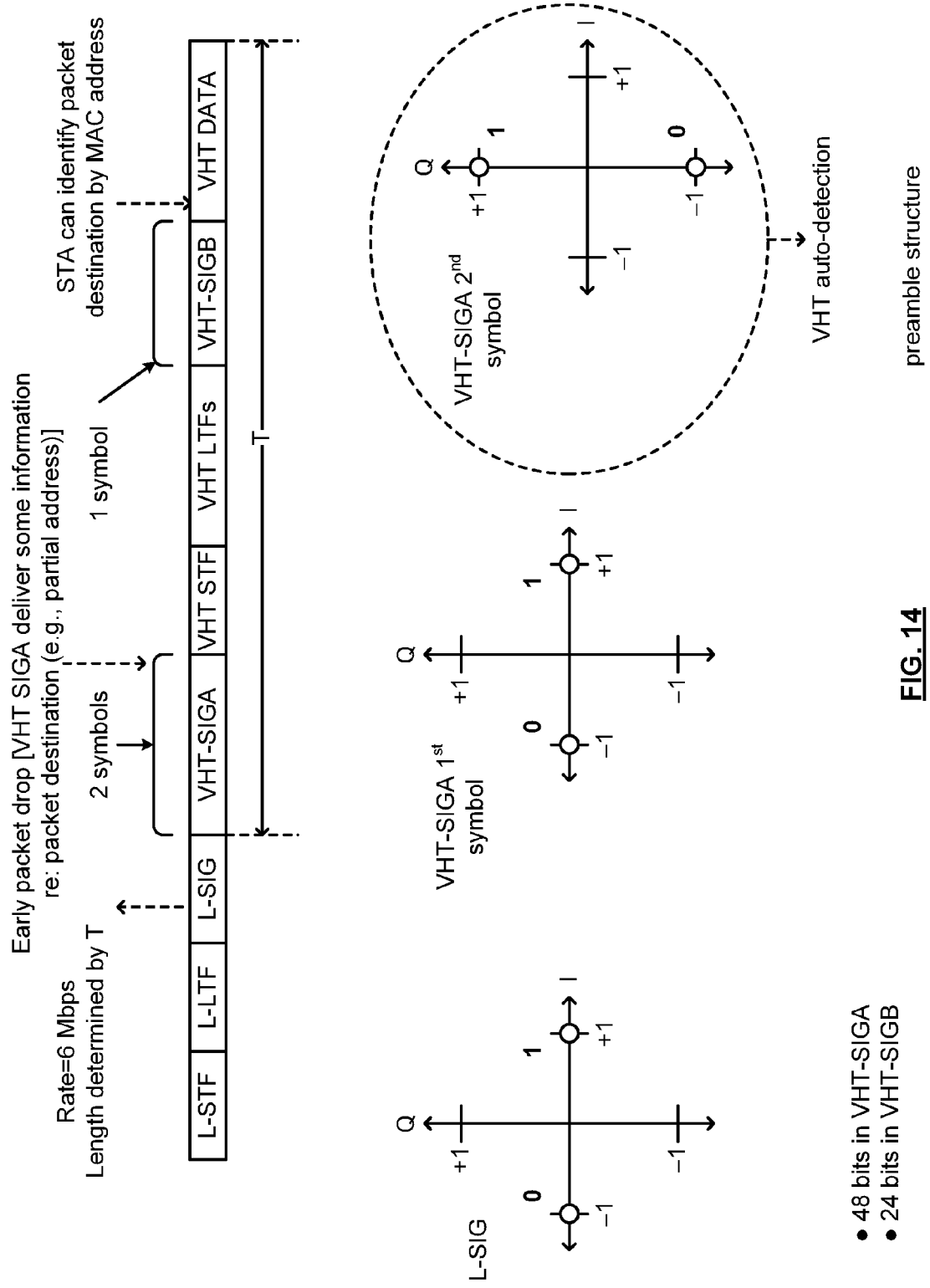
FIG. 14 is a diagram illustrating an embodiment of a preamble structure as may be employed within communications between wireless communication devices.

FIG. 14 is a diagram illustrating an embodiment of a preamble structure as may be employed within communications between wireless communication devices. With respect such references herein, devices that are compliant with an older version of a wireless communication standard (e.g., a legacy) may be those compliant with earlier versions of IEEE 802.11x (where x may be a, b, g, n, etc.). Certain of the embodiments described herein may not only be compliant with such legacy communication protocols, standards, and/or recommended practices, but may also be compliant with newer communication protocols, standards, and/or recommended practices such as IEEE 802.11ac, among others.

Packet construction in accordance with the various principles presented herein, generally speaking, may include a preamble, a signal field, and a payload. Such a packet may also be viewed as being partitioned into a PHY portion (e.g., such as corresponding to a header of the packet) and a MAC portion, as will also be seen with respect to other embodiments. Generally, the preamble is used for carrier acquisition, synchronization, channel estimation, etc. The signal field is used to communicate frame specific parameters (e.g., coding rate, frame length, etc.) to a receiving device. The payload is the data portion of the packet.

A frame format may be modified based on a number of parameters, including, dependence upon the presence of other wireless communication devices in a communication system. In some instances, a communication may include various types of wireless communication devices having different respective capability sets (e.g., legacy devices, newer devices, mixed mode devices, etc.).

For example, with some embodiments, in the 5 GHz spectrum, legacy devices may include those being compliant in accordance with IEEE 802.11a and IEEE 802.11n, among others. Legacy devices must be able to recognize a packet has been transmitted and remain off the air for the duration of the packet (i.e., remain off of the communication channel or communication medium giving access to other communication devices). Thus, packets formed in accordance with the various aspects presented herein may include certain portions therein that are compliant with legacy or prior standards, recommended practices, etc. As one example, a new packet may include a legacy preamble and a signal field along with a new, modified version of a payload. With such a novel packet structure, a legacy device will still be able to recognize the legacy preamble and decode the legacy signal field. The legacy signal field contains information that tells the legacy devices how long the packet will be on the air (i.e., occupy or be using the communication channel or communication medium). The legacy signal field does not contain IEEE 802.11ac specific parameters (that is done in the IEEE 802.11ac signal field).

Referring to FIG. 14, the preamble includes a legacy short training field (L-STF), a legacy long training field (L-LTF), a legacy signal field (L-SIG), at least one (e.g., a first) very high throughput signal field (VHT-SIGA), a very high throughput short training field (VHT-STF), at least one very high throughput long training field (VHT-LTF), a second very high throughput signal field (VHT-SIGB), followed by a data field (VHT DATA).

In one embodiment, the VHT-SIGA field includes 48 bits, and the VHT-SIGB field includes 24 bits. The length of the packet is determined by T, the length extending from the end of the L-SIG field to the end of the packet. In some instances, not all packets are the same length, as differing amounts of data may be included within different packets. The L-SIG field may include a symbol mapped in accordance with the constellation shown on the lower left portion of the diagram. The VHT-SIGA field may be composed of two distinct symbols, symbol mapped in accordance with the constellations shown at the bottom and the lower right portions of the diagram. VHT auto-detection (e.g., to determine if the packet corresponds to non-legacy format) may be performed using the constellation shown at the lower right portion of the diagram.

In accordance with such a preamble constructed in accordance with these principles, early packet drop may be performed when the VHT-SIGA field includes some information regarding those wireless communication devices to which the packet is intended. For example, rather than a receiving wireless communication device needing to process virtually the entire packet before extracting receiver address (RA) information from the MAC portion of the packet, some information (e.g., partial address information, etc.) may be included in the PHY header (e.g., the VHT-SIGA field) to indicate to which receiving wireless communication devices the packet is intended so that those wireless communication devices not included in the recipient group may modify the manner of processing the packet. The modification of the processing of the packet, as performed by a receiving wireless communication device, may relate to dropping the packet, ceasing to process the remainder of the packet, powering down, entering into stand-by or sleep mode, etc. Any of a variety of modified processing of the packet may be performed based on an early determination of which receiving wireless communication devices the packet is intended.

By performing such modified processing of the packet, power savings may be effectuated within a receiving wireless communication device (e.g., STA) that receives such a packet when that packet is not particularly intended for that receiving wireless communication device (e.g., STA). For example, when a multi-user packet is transmitted from a transmitting wireless communication device to a number of receiving wireless communication devices, yet the multi-user packet is actually only intended for a subset of those receiving wireless communication devices (e.g., as few as one, two or more yet less than all, etc.), then those receiving wireless communication devices that received the multi-user packet may process a PHY header of the multi-user packet to determine very quickly during the processing of the multi-user packet whether the multi-user packet is intended for that receiving wireless communication device or not. If it is not, then the multi-user packet may be dropped, processing of the multi-user packet may cease, the receiving wireless communication device may power down some (less than all) or its entire functionality/circuitry/etc. or enter a sleep mode or other power savings operational mode, etc.

In some embodiments, preliminary information related to the recipient list may be extracted from partial address information included within the PHY header. In certain embodiments, a group identification (group ID) related information located within the PHY header may be used to provide such information. In addition, such information within the PHY header may not only include information indicating for which receiving wireless communication devices the packet is intended, but such information (and/or other information) within the PHY header may also indicate which portions of the multi-user packet are intended for respective receiving wireless communication devices. For example, such information within the PHY header can indicate for which receiving wireless communication devices the multi-user packet is intended, and that same information within the PHY header (and/or other information in the PHY header) may indicate respective fields within the multi-user packet that are intended for different receiving wireless communication devices. Examples of some types of multi-user packets include those in accordance with orthogonal frequency division multiple access (OFDMA), multi-user multiple input multiple output (MU-MIMO), combinations thereof, etc.

Figure 15:
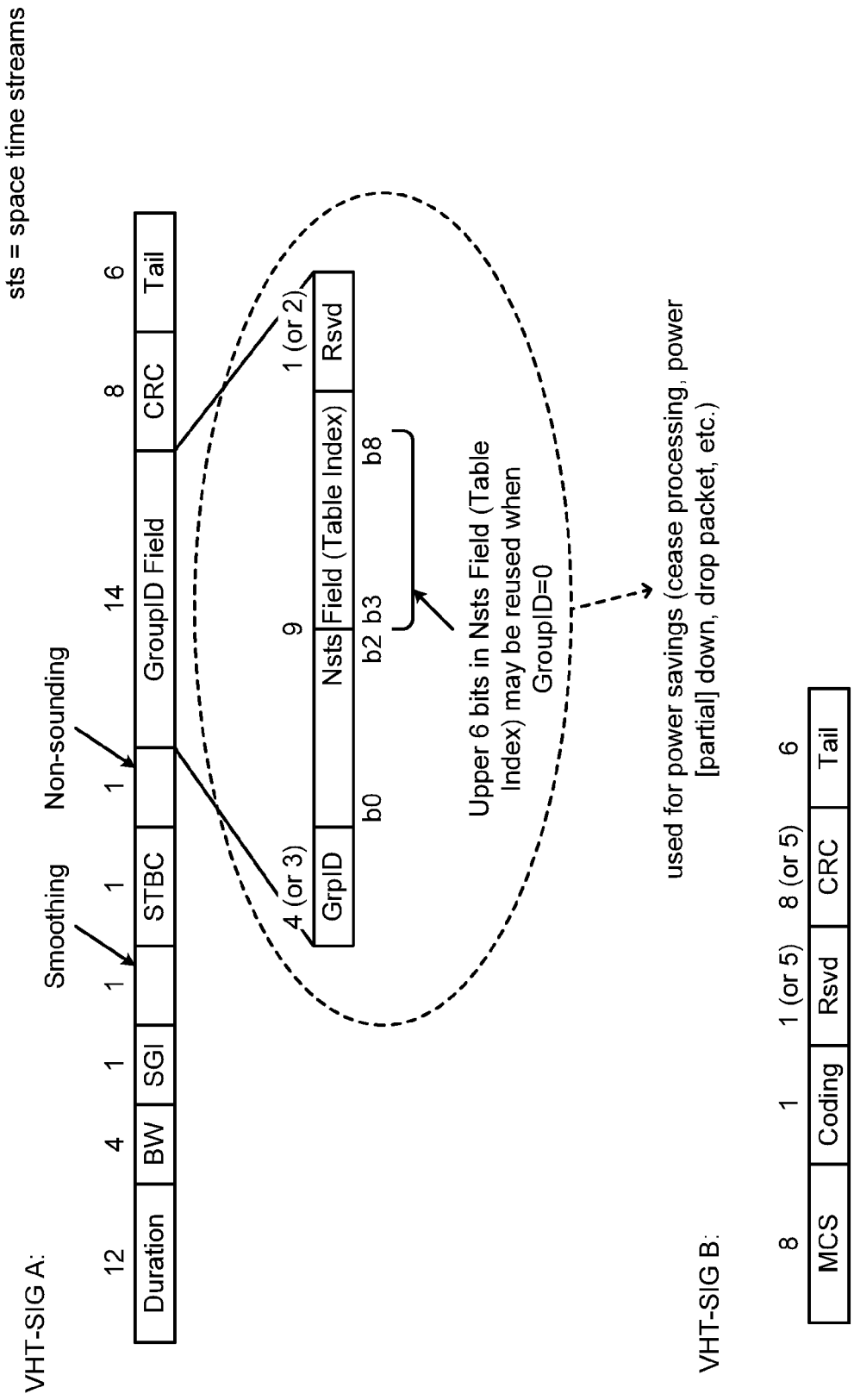
FIG. 15 is a diagram illustrating an embodiment of signal field bit allocation as may be employed within communications between wireless communication devices.

FIG. 15 is a diagram illustrating an embodiment of signal field bit allocation as may be employed within communications between wireless communication devices. This embodiment shows how group ID related information within a multi-user packet may be used to indicate such information as described herein (e.g., PHY header information indicating recipients, respective fields intended for such recipients, etc.). In another embodiment, group ID may consist of 6 bits and the Nsts field may consists of 12 bits, depending on how many bits are available in the VHT-SIGA field.

With the structure of this diagram, a non-sounding bit is included in the VHT-SIG A field. When the non-sounding bit is set to 1, the packet is a single user or multi-user (SU/MU)-MIMO DATA packet. Each recipient STA determines its STA number by examining the group ID in the SIGA field and comparing it to a previously assigned set of group ID values, each of which ahs associated information including at least a set of receiving wireless communication devices (e.g., STAs) that are members of that group ID and receiver (e.g., STA) number for the members of that group ID. If a match of the group ID is found among the previously assigned group ID values, and the matching group ID includes this receiver (e.g., STA) as a group member, then the receiving wireless communication device (e.g., STA) determines its receiver (STA) number from the associated information. If a pre-assigned group ID (NOTE: group ID, GroupID, Group ID, and/or their respective equivalents, may be used interchangeably herein) is not used within the SIGA field, then the GroupID=0 or any specific or predetermined value to represent the packet is either SU-MIMO or Broadcast, which implies all STAs in a basic services set (BSS) needs to decode the packet, and only the first 3 bits of the Nsts field indicates the number of VHT-LTFs present in the structure.

When the non-sounding bit is set to 0 the packet is a sounding packet. For such operation, typically the GroupID=0 (or a specific or predetermined value) and the first 3 bits in the Nsts field indicates the number of VHT-LTFs to be sounded (other bits: b3-b8 can be used for some other feature). If the GroupID of a sounding packet is non-zero (when the AP wants to reuse pre-assigned GroupID to sound STAs), all 9 bits in FIG. 15 in the Nsts field are used. As mentioned elsewhere herein, it is noted that the Nsts field may be composed of a different number of bits without departing from the scope and spirit of the invention (e.g., the Nsts field may be 12 bits in another embodiment). However, only Nsts_k for STA_k, where k=1, 2, 3, 4 (e.g., Nsts_k being those space-time streams corresponding particularly to that STA) to be sounded are not zero and the number of VHT-LTFs=sum(Nsts_k).

From certain perspectives, the use of group ID and group definition fields in accordance with the various aspects presented herein may be viewed as moving media access control (MAC) addressing information to the physical layer (PHY). This way, the receiving wireless communication device is operative to determine (e.g., at the PHY level) if it is an intended receiving wireless communication device and also how it is to process a received transmission. By moving addressing information from the MAC to the PHY, such recipient related information may be determined much sooner and earlier during the processing of the multi-user packet by various receiving wireless communication devices within a communication system that is operative to accommodate MU operation.

In accordance with the description herein, the group ID field information may be used to enhance the effectiveness of power saving operations, such as might be performed by receiving wireless communication devices that may receive a multi-user packet including the structure described herein. Such power savings may relate to dropping of the packet, ceasing processing completing PHY header processing, performing power down [all, partial, sleep mode, etc.], etc.

In accordance with the power saving that may be effectuated with a non-zero group ID, it may be seen that when resolvable LTFs are employed in combination with a group ID for MU-MIMO, each respective receiving wireless communication device (e.g., STA) can identify whether it is a candidate to be a recipient of the packet in a much earlier manner, for example, when it detects VHT-SIGA as compared to waiting until processing of the MAC portion of the packet to identify MAC address information such as receiver address (RA), etc. to identify the recipient list. For example, if a receiving wireless communication device (e.g., STA) identifies it is not in the list of recipients (e.g., not a member of the group ID) by examining the group ID in VHT-SIGA and the previously assigned group ID values, then that receiving wireless communication device (e.g., STA) may drop the packet without efforts to process VHT-STFs, VHT-LTFs, VHT-SIGB, and a part of payload. In this way, processing time up to at least 50% may be saved using such preliminary information within a PHY header of a packet (e.g., a packet with group ID) compared to operating in accordance with processing the MAC portion of the packet to identify MAC address, RA information, etc. to identify whether the receiving wireless communication device (e.g., STA) is included in the intended recipient list.

For example, considering some information related to a group ID embodiment, such as the following fields, with indicated respective durations, L-STF (8 μsec), L-LTF (8 μsec), L-SIG (8 μsec), VHT-SIGA (8 μsec), VHT-STF (4 μsec), VHT-LTF (16 μsec for Nss=4), VHT-SIGB (4 μsec), first OFDM symbol in payload (4 usec), a receiving wireless communication device (e.g., STA) would not have to detect the field portions following VHT-SIGA if that receiving wireless communication device (e.g., STA) drops the packet right after VHT-SIGA (e.g., after employing such information in the PHY header, which may be group ID in some embodiments to identify the recipient list and seeing that that receiving wireless communication device (e.g., STA) is not in the recipient list).

For SU-MIMO applications, such implementations can also save power when such information in the PHY header, which may be group ID, is used to perform such early detection of recipients as compared to using MAC related information (e.g., early detection with Nsts=[0 8 0 0], which means only the $2^{nd}$ STA has a non-zero number of streams [8 in this example], and the other STAs do not have any designated streams).

Considering the power savings as may be achieved in which group ID=0, or a specific or predetermined value, within SU-MIMO applications, if a management packet exchange is not employed in accordance with a SU-MIMO application (e.g., when operating in an open loop mode such as without preliminarily providing a sounding frame), then there may not be a group ID assignment at that time [such as when a group definition field has not been received].

In such instances, group ID may be set to be zero (e.g., group ID=0), or a specific or predetermined value, with only first 3 bits valid in Nsts field. The other 6 bits in the Nsts field (or 9 bits, in an alternative embodiment) are still available for other usage. For example, these 6 bits (or 9 bits, in an alternative embodiment) may be used for power saving for SU-MIMO with group ID=0, or a specific or predetermined value to represent it as a SU-MIMO packet.

As may be seen in FIG. 15, when group ID=0, or a specific or predetermined value, for SU-MIMO, then the bits in the Nsts Field (Table Index), b3 to b8 (6 bits) are available. These 6 bits may be used in other formats to indicate a portion of an association identifier (AID), for example, each bit in Nsts field associated with two bits of an AID by XOR. In other words, 3 bits XOR may be performed (e.g., 1 bit in Nsts and 2 bits in AID) except for the last bit in AID (e.g., 1 bit in Nsts and 1 last bit in AID XOR).

The first 5 bits in the Nsts field may be used for the 5 LSB bits in AID of the receiving wireless communication device (e.g., STA). In some embodiments, a transmitting wireless communication device (e.g., AP) may notify a particular bit position for those 5 LSB bits in the AID, if necessary. In other words, the particular location of those bit positions may be different within different communications (e.g., such as bits b3 to b7 in the 11 bits of the AID), as defined by the transmitting wireless communication device (e.g., AP). The AID may be assigned during the association process by a transmitting wireless communication device (e.g., AP), and can be 11 bits in total. The last 1 bit in the Nsts field may indicate whether the other 6 MSB bits in the AID have any non-zero value. In other embodiments, all of the 6 bits (or 9 bits, in an alternative embodiment) can represent any part of AID (e.g., 11 bits in total). For example, 6 bits MSB or 6 bits LSB, or any part of AID bits.

As may be understood when using information in accordance with a PHY header to indicate a recipient list, some frames should not be dropped in accordance with PHY processing. For example, frames with long network allocation vector (NAV) reservations, request to send (RTS), clear to send (CTS), etc. should not be dropped even though a receiving wireless communication device (e.g., STA) is not the intended recipient as determined by examining the RA field of these frames. Particular values and information may be employed in these frames to indicate that no receiving wireless communication device (e.g., STA) can enter power save during such receptions to ensure receipt of MAC DUR information.

For example, for indicating that no receiving wireless communication device (e.g., STA) should drop the frame (e.g., RTS/CTS), the bits b3 to b8 bits may all be set to zeros. An AID=0, or specific or particular value, may be used to indicate that there is no receiving wireless communication device (e.g., STA) targeted as the recipient that might enter power save, and therefore, all receiving wireless communication devices (e.g., STAs) may drop the reception. This situation would arise when the targeted recipient is a transmitting wireless communication device (e.g., AP) which will never enter a power save mode.

Figure 16:
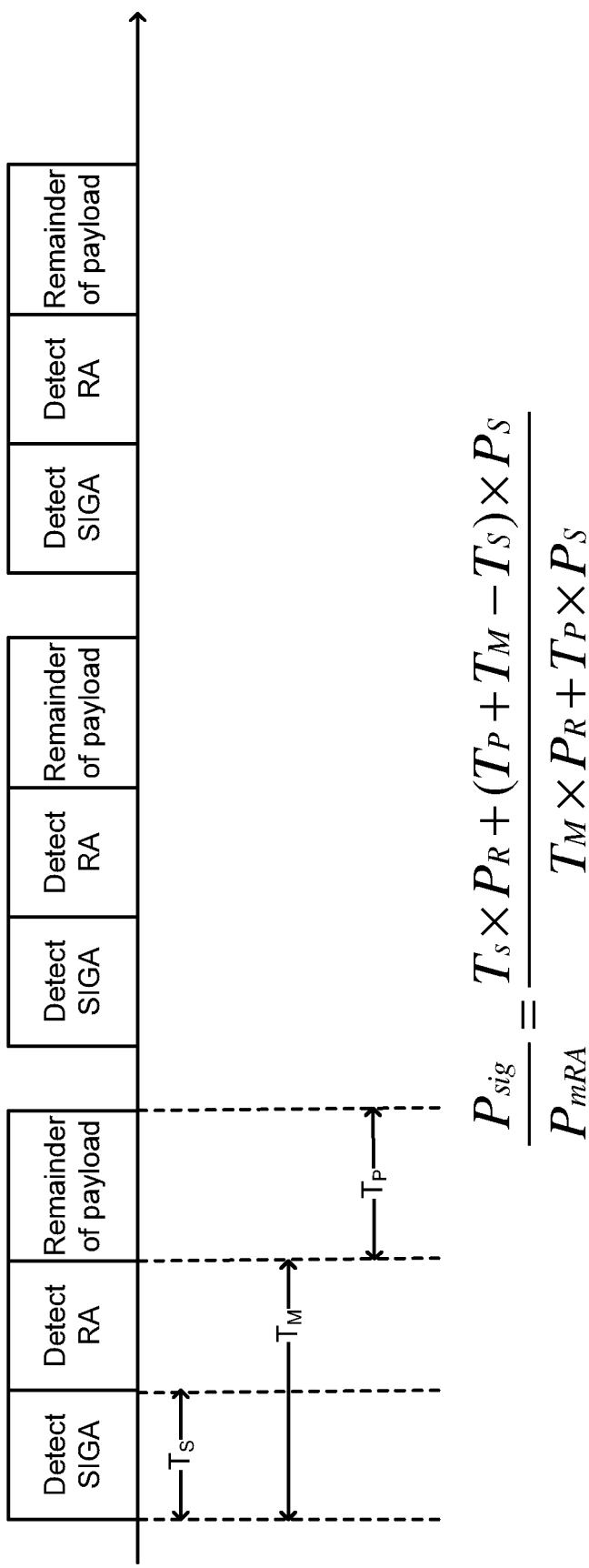
FIG. 16 is a diagram illustrating an embodiment of power saving comparison.

FIG. 16 is a diagram illustrating an embodiment of power saving comparison. Such a comparison for power savings calculation is made with respect to an embodiment that employs PHY header related information to determine a recipient list compared to an embodiment that employs MAC related information. As may be seen, a significant amount of power savings may be effectuated by performing recipient list determination using PHY header related information. For example, power savings of approximately 20% to 48% by early detection (e.g., using PHY header information) of the recipient list to allow for modified processing (e.g., dropping of the packet, powering down, entering sleep mode, etc.) is achievable.

Figure 17:
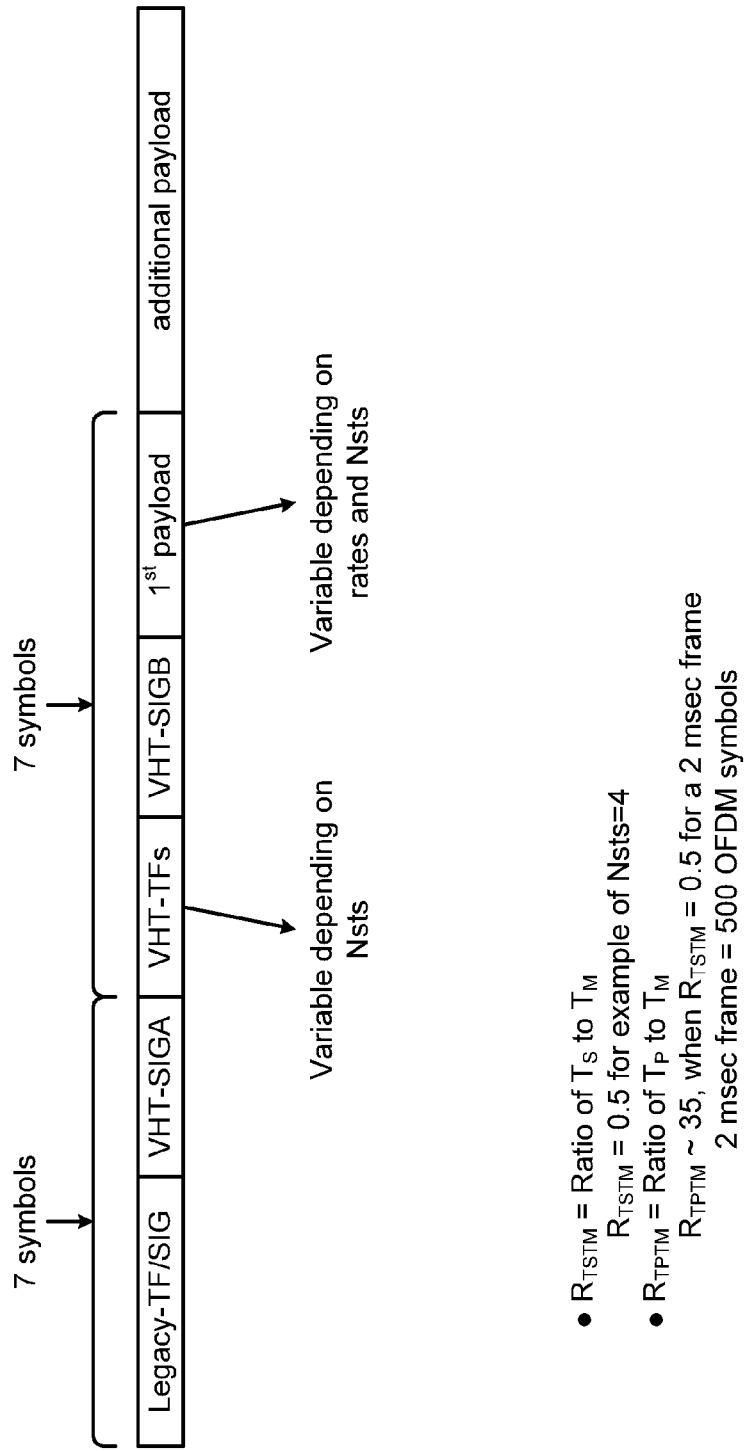
FIG. 17 is a diagram illustrating an embodiment comparing PHY header duration and MAC receiver address (RA).

FIG. 17 is a diagram illustrating an embodiment comparing PHY header duration and MAC receiver address (RA). Such an embodiment employs an example with 4 space-time streams (STSs), though differing numbers of STSs may be employed without departing from the scope and spirit of the invention. When appropriate information in a PHY header such as a non-zero group ID is used (e.g., group ID≠0), or a group ID≠a specific or predetermined group ID value, where such a specific or predetermined group ID value is defined for SU-MIMO, is used with a management frame exchange, power savings may be achieved by identifying the list of recipients in VHT-SIGA.

When appropriate information in a PHY header such as a zero group ID is used (e.g., group ID=0), or a specific or predetermined group ID value for SU-MIMO is used, then the first 3 bits in the Nsts field (that includes 9 bits in total in one embodiment, or 12 bits in total in another embodiment) are used for the number of VHT-LTFs included therein, and the other 6 bits (or 9 bits, in an alternative embodiment) can be used to indicate a partial AID (e.g., partial address information) for power saving within SU-MIMO applications.

As mentioned above, power savings of approximately 20% to 48% by early detection (e.g., using PHY header information) may be achieved. For the convenience of the reader, the equation employed for calculating such for power saving comparisons:

$$R_{TMTS} = \frac{T_M}{T_S}$$

$$R_{TSTM} = \frac{T_S}{T_M}$$

$$R_{TPTM} = \frac{T_P}{T_M}$$

$$R_{PRPS} = \frac{P_R}{P_S}$$

$$\frac{P_{sig}}{P_{mRA}} = \frac{T_S \times P_R + (T_P + T_M - T_S) \times P_S}{T_M \times P_R + T_P \times P_S}$$

$$= \frac{\frac{T_M}{R_{TMTS}} \times P_S \times R_{PRPS} + \left(T_M \times R_{TPTM} + T_M - \frac{TM}{R_{TMTS}}\right) \times P_S}{T_M \times P_S \times R_{PRPS} + T_M \times R_{TPTM} \times P_S}$$

$$= \frac{\frac{R_{PRPS}}{R_{TMTS}} + R_{TPTM} + 1 - \frac{1}{R_{TMTS}}}{R_{PRPS} + R_{TPTM}}$$

$$= \frac{R_{TSTM} \times R_{PRPS} + R_{TPTM} + 1 - R_{TSTM}}{R_{PRPS} + R_{TPTM}}$$

Figure 18:
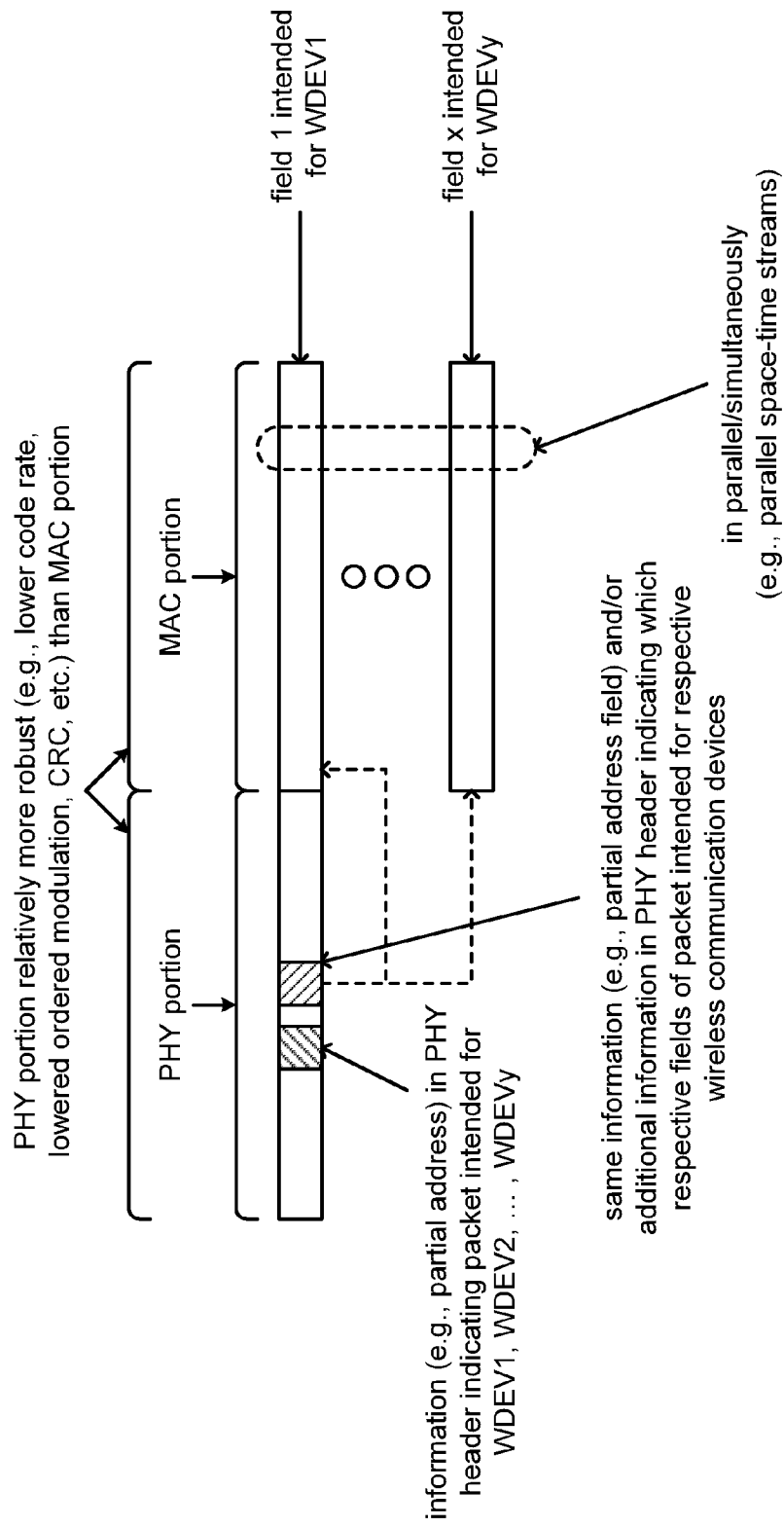
FIG. 18 is a diagram illustrating an embodiment of a packet in which a PHY portion (e.g., header) thereof includes information indicating packet recipients.

FIG. 18 is a diagram illustrating an embodiment of a packet in which a PHY portion (e.g., header) thereof includes information indicating packet recipients. This embodiment generally shows a packet being partitioned into a PHY portion and MAC portion, that is a PHY header and a PHY payload. Generally speaking, the PHY portion of the packet has a relatively more robust character to ensure that all receiving wireless communication devices (e.g., legacy wireless communication devices, those wireless communication devices operative in accordance with newer communication protocols, etc.) can receive, demodulate, decode, etc. the information included in the PHY portion (e.g., header) of the packet. As such, all wireless communication devices within a communication system that receive such a packet will be able to process the PHY portion thereof thereby determining the recipient list. The MAC portion (PHY payload) of the packet might be transmitted using a less robust character, and it is therefore less likely to be received, demodulated, decoded, etc. by all recipients.

There are many ways to effectuate such relatively higher robustness for the PHY portion of the packet (e.g., using a less complex error correction code (ECC), using a lower code rate, using lowered ordered modulations [e.g., BPSK being lowered order than QPSK, QPSK being lowered order than 16 QAM, 16 QAM being lowered order than 64 QAM, 64 QAM being lowered order than 32 APSK, etc.], using cyclic redundancy check (CRC) for the PHY portion, etc.).

Information within the PHY portion may be used to indicate the recipient list (e.g., those receiving wireless communication devices (e.g., STAs) for which the multi-user packet is intended). In some instance, that same information (and/or additional information) within the PHY portion may be used to indicate respective fields within the multi-user packet that are intended for respective receiving wireless communication devices (e.g., STAs). It is of course noted that certain fields may be intended for more than one receiving wireless communication device (e.g., STA). As described elsewhere herein, group ID is one such option by which such information may be included within the PHY header of a multi-user packet.

Figure 19:
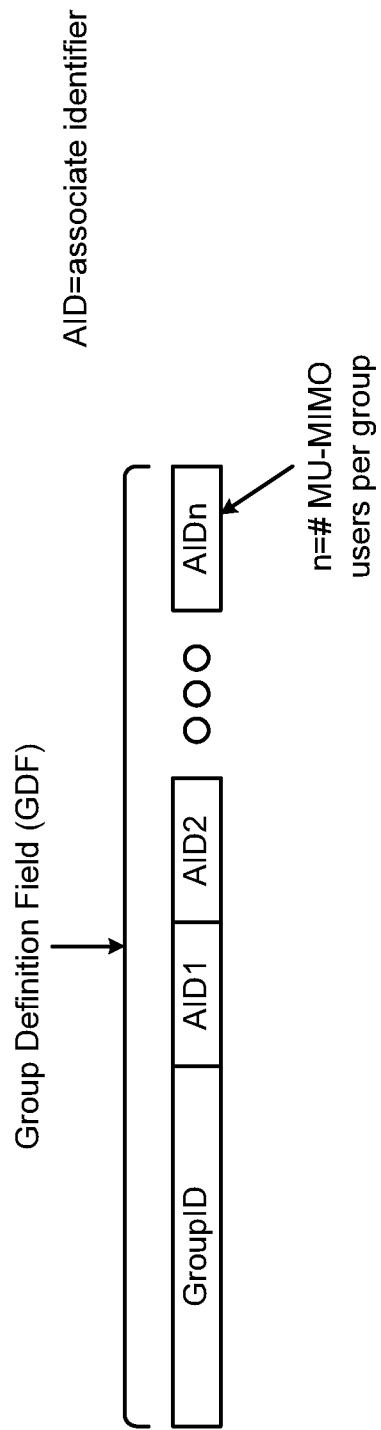
FIG. 19 is a diagram illustrating an embodiment of various group identification fields being transmitted to one or more receiving wireless communication devices.

FIG. 19 is a diagram illustrating an embodiment of various group identification fields being transmitted to one or more receiving wireless communication devices. A group definition field (GDF) may be defined as a group ID (e.g., y bits, where y is an integer) is used to specify a group of n MU-MIMO users in a specified order. The group ID is defined by the transmitting wireless communication device (e.g., AP) and is communicated to the receiving wireless communication devices (e.g., STAs). The GroupID is assigned by a transmitting wireless communication device (e.g., AP) and is then informed to the respective receiving wireless communication devices (e.g., STAs), either when such receiving wireless communication devices (e.g., STAs) join the basic services set (BSS) or when GroupID assignment is updated by a management frame sent by AP. The management frame employed to update/manage the GroupID assignment can be either a Broadcast frame or a Unicast frame. The group ID may be transmitted within the body of a management frame that may take any of a variety of formats including MU-MIMO, OFDMA, MU-MIMO/OFDMA, etc.

For example, such a management frame may be a multicast sounding frame (e.g., as described elsewhere herein), a non-sounding frame, or a unicast frame in the format of either sounding or non-sounding frame. In one embodiment, a management frame without sounding (non-sounding type) may be used to indicate an AID list (e.g., AID=STA identifier, such as an 11-bit association identifier AID) for a group ID without requesting a channel measurement feedback frame (e.g., when the management frame transmitter already has channel state information (CSI)). A group ID is modified or created by transmitting a group-definition-field. Until a subsequent group-definition-field is received, the last received group-definition-field is used to interpret and analyze any received group ID. In some instances where the group ID may be overloaded, the transmitting wireless communication device (e.g., AP) may assign the same group ID to different sets of users. For example, even though a group ID might contain y bits, allowing for $2^y$ (or 2^y) distinct group ID values, each such group ID might represent multiple unique groupings of receiving wireless communication devices (e.g., STAs). Each receiving wireless communication device can be a member of up to $2^y$ (or 2^y) groups, where y is an integer representing the number of bits in the group ID.

The group definition field (GDF) may be defined as follows: n number of MU-MIMO users per group (n=4 for example). Also, several GDFs may be transmitted in one management or sounding frame (e.g., for specifying different groups of users, etc.). Another field within the transmission may be used to indicate how many GDFs are included in the management or sounding frame. Upon reception of GDF, each of the receiving wireless communication devices (e.g., STAs) knows its own respective number (STA number), such as from 1-4 in this embodiment) associated with group ID that is defined by the GDF. This STA number indicates the position in the PHY header of the designated long training field (LTF) for that STA if the STA belongs to the groupID that is found in the VHT-SIG-A field of the PHY header.

Within the various diagrams and embodiments described and depicted herein, wireless communication devices may generally be referred to as WDEVs. It is noted that such wireless communication devices may be wireless stations (STAs), access points (APs), or any other type of wireless communication device without departing from the scope and spirit of the invention. The reference numeral convention associated with FIG. 16 (e.g., wireless communication device 1601 generally performing operations which may be associated with transmitting wireless communication devices such as APs, and other wireless communication devices 1602a, 1602b, 1602c, etc. generally performing operations which may be associated with receiving wireless communication devices such as STAs) is employed within various other diagrams for ease of illustration and understanding for the reader in providing a relatively analogous context in which various types of communications may occur.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Figure 20:
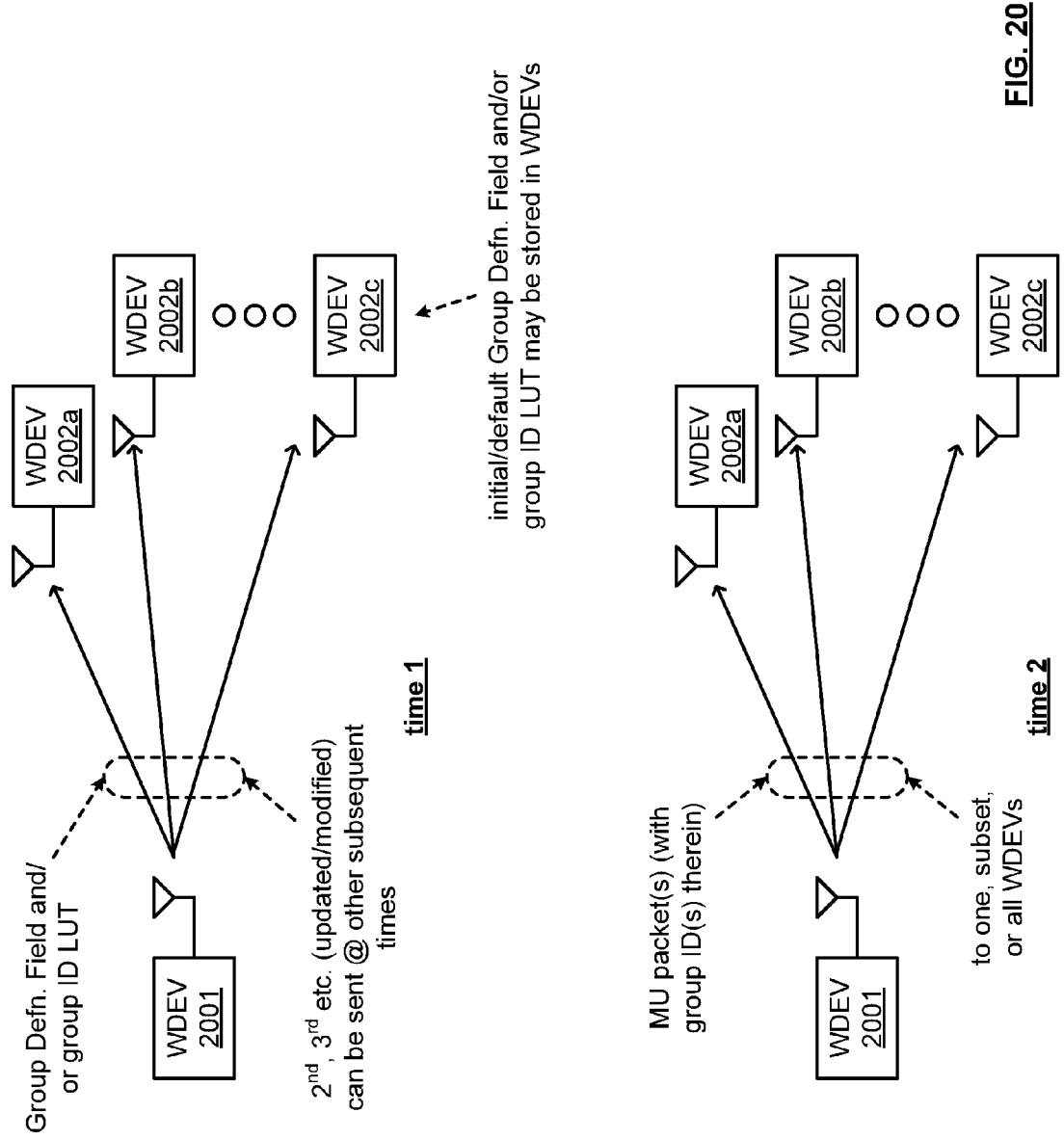
FIG. 20 is a diagram illustrating an embodiment of communications between various wireless communication devices within a communication system.

FIG. 20 is a diagram illustrating an embodiment of communications between various wireless communication devices within a communication system. Within this diagram, wireless communication device 2001 is operative to perform transmitting of a group definition field and/or a group identification field (group ID) look up table (LUT) to a plurality of wireless communication devices (shown as wireless communication devices 2002a, 2002b, 2002c, etc.). The group ID LUT may be viewed as being a table that provides a very efficient representation between the various subsets of the wireless communication devices (or users) and group IDs. For example, each respective group ID within the group ID LUT may correspond to one or more subsets of the wireless communication devices. When a particular wireless communication device is included within multiple respective subsets, it is located within a common location within each of those subsets. For example, if the wireless communication device 2002a is located in a given location (e.g., the second location) within a particular subset, then that same wireless communication device 2002a is located within the same location (e.g., the second location) within all other subsets that include that same wireless communication device 2002a as well.

It is noted that the various wireless communication devices within a communication system employ a common group ID LUT when operating cooperatively with one another. That is to say, for coordinated operation in accordance with using the very efficient manner of associating various group IDs and wireless communication devices (or users), the various wireless communication devices all respectively need to have access to the common group ID LUT. In embodiments in which the group ID LUT may be modified or updated (e.g., as a function of time such as every X number of seconds, after a particular event occurs, or based on some other consideration, etc.), then all of the various wireless communication devices should be employing the most recent or current, common group ID LUT for coordinated operation.

After the wireless communication device 2001 transmits the group definition field and/or the group ID LUT to the plurality of wireless communication devices (e.g., such as shown at time 1), then the wireless communication device 2001 operates by transmitting a multi-user packet to the plurality of wireless communication devices (e.g., such as shown at time 2). Such a multi-user packet may be communicated in accordance with orthogonal frequency division multiple access (OFDMA) signaling, multi-user multiple input multiple output (MU-MIMO) signaling, a combination thereof (such as OFDMA/MU-MIMO), etc. Such a multi-user packet includes at least one group ID therein that indicates, based on the group definition field or the group ID LUT, a first field of the multi-user packet to be processed by a first of the plurality of wireless communication devices (e.g., wireless communication device 2002a) and a second field of the multi-user packet to be processed by a second of the plurality of wireless communication devices (e.g., by wireless communication device 2002b). For example, in certain embodiments, the first field of the multi-user packet to be processed would be the group ID.

As mentioned, any one group ID may corresponds to more than one subset of the plurality of wireless communication devices, a condition previously described as overloading of group IDs. As will be seen elsewhere herein, a group ID may correspond to as few as one subset of wireless communication devices, or alternatively, to a plurality of subsets of wireless communication devices (e.g., to a first subset of wireless communication devices, and also to a second subset of wireless communication devices, etc.).

Also, based on the group ID, at least one additional field within the multi-user packet indicates a first at least one space-time stream (STS) within the multi-user packet corresponding to the first of the plurality of wireless communication devices and a second at least one STS within the multi-user packet corresponding to a second of the plurality of wireless communication devices. That is to say, when a given multi-user packet does in fact correspond to a given wireless communication device, then further details are provided to indicate which particular one or more STSs employed and corresponding to that particular wireless communication device. For example, within an N_sts field of a communication received from the wireless communication device 2001, a given recipient wireless communication device that is included within at least one subset of wireless communication devices corresponding to the group ID, may consider the N_sts field in accordance with identifying a non-zero value therein to indicate which particular STSs correspond to that recipient wireless communication device.

Figure 21:
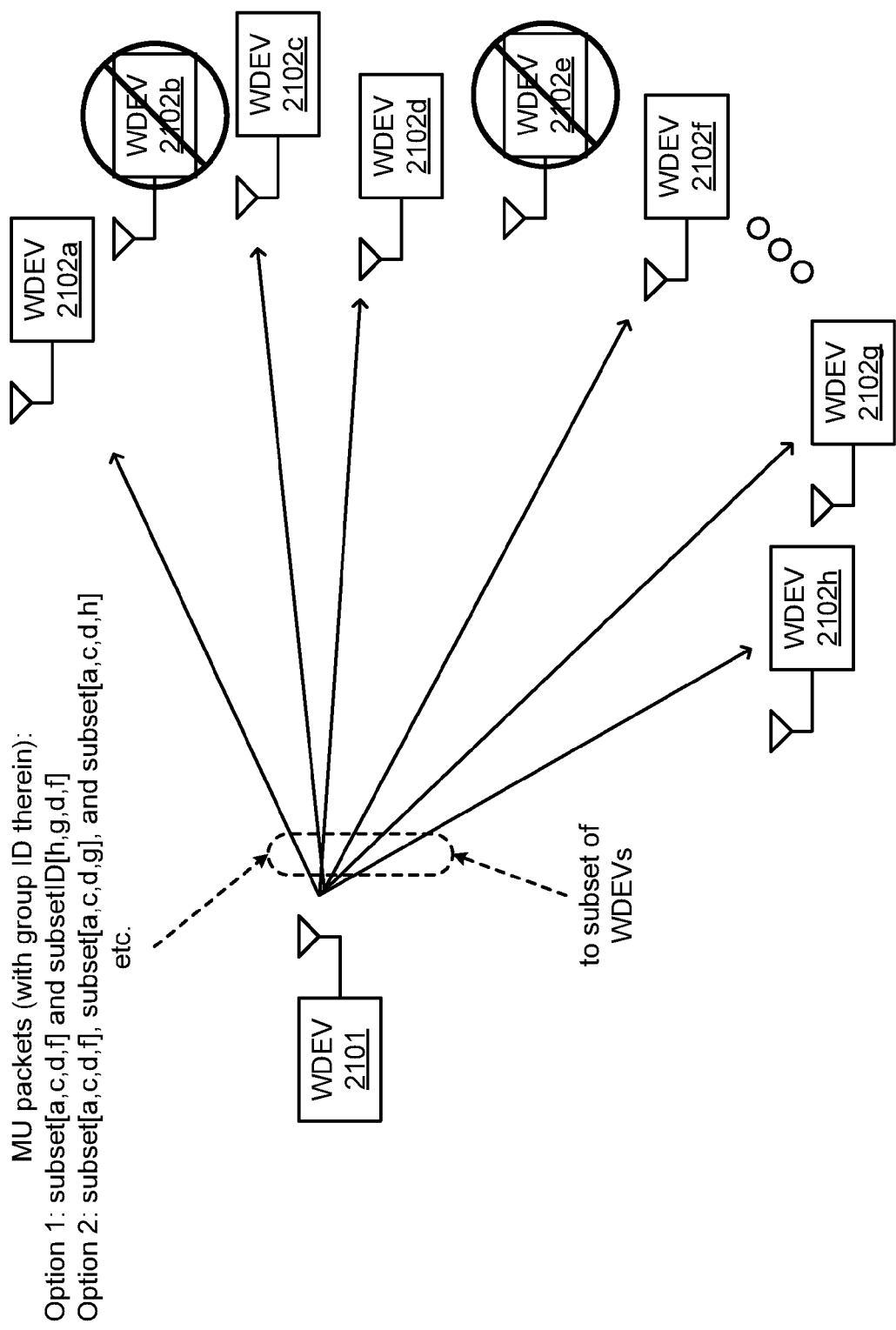
FIG. 21 is an alternative diagram illustrating an embodiment of communications between various wireless communication devices within a communication system.

FIG. 21 is an alternative diagram illustrating an embodiment of communications between various wireless communication devices within a communication system. This diagram shows different means by which different groups of wireless communication devices may be indicated by a group ID (such as included within a multi-user packet or other communication provided from wireless communication device 2101) to indicate that the communication is intended for that group of wireless communication devices.

In this embodiment, each respective subset of wireless communication devices includes up to 4 wireless communication devices. When the wireless communication device 2101 desires to provide a communication corresponding to more than 4 wireless communication devices, a single group ID can operate in accordance with overloading. That is to say, such a group ID may correspond to at least two subsets of wireless communication devices that, when considered together, include these more than 4 wireless communication devices.

Looking particularly at the embodiment of this diagram, the wireless communication device 2101 desires to provide one or more multi-user packets to some, but not all, of the wireless communication devices 2102a, 2102b, 2102c, 2102d, 2102e, 2102f, 2102g, 2102h, etc. (i.e., specifically only to wireless communication devices 2102a, 2102c, 2102d, 2102f, 2102g, 2102h, etc. in this embodiment). When considering a situation in which no more than 4 wireless communication devices are included within any one subset and no more than one group ID value is provided within a single multi-user (MU) packet, then a variety of subset combinations may be associated with a group ID to indicate communications to such a group of wireless communication devices (including more than 4 wireless communication devices) for each transmitted multi-user packet. Some examples are provided: an option 1 includes two subsets [a, c, d, f] and [h, g, d, f]; an option 2 includes three subsets [a, c, d, f], [a, c, d, g], and [a, c, d, h].

For example, the subset [a, c, d, f] corresponds to wireless communication devices 2102a, 2102c, 2102d, and 2102f. The subset [h, g, d, f] corresponds to wireless communication devices 2102h, 2102g, 2102d, and 2102f. The inclusion of wireless communication devices within other of the subsets may be understood analogously by the reader. As may be seen, when a given wireless communication device is included within more than one particular subset, it is located within the same location within each of those particular subsets.

FIG. 22, FIG. 23, FIG. 24A, and FIG. 24B illustrate embodiments of methods for operating wireless communication devices.

Figure 22:
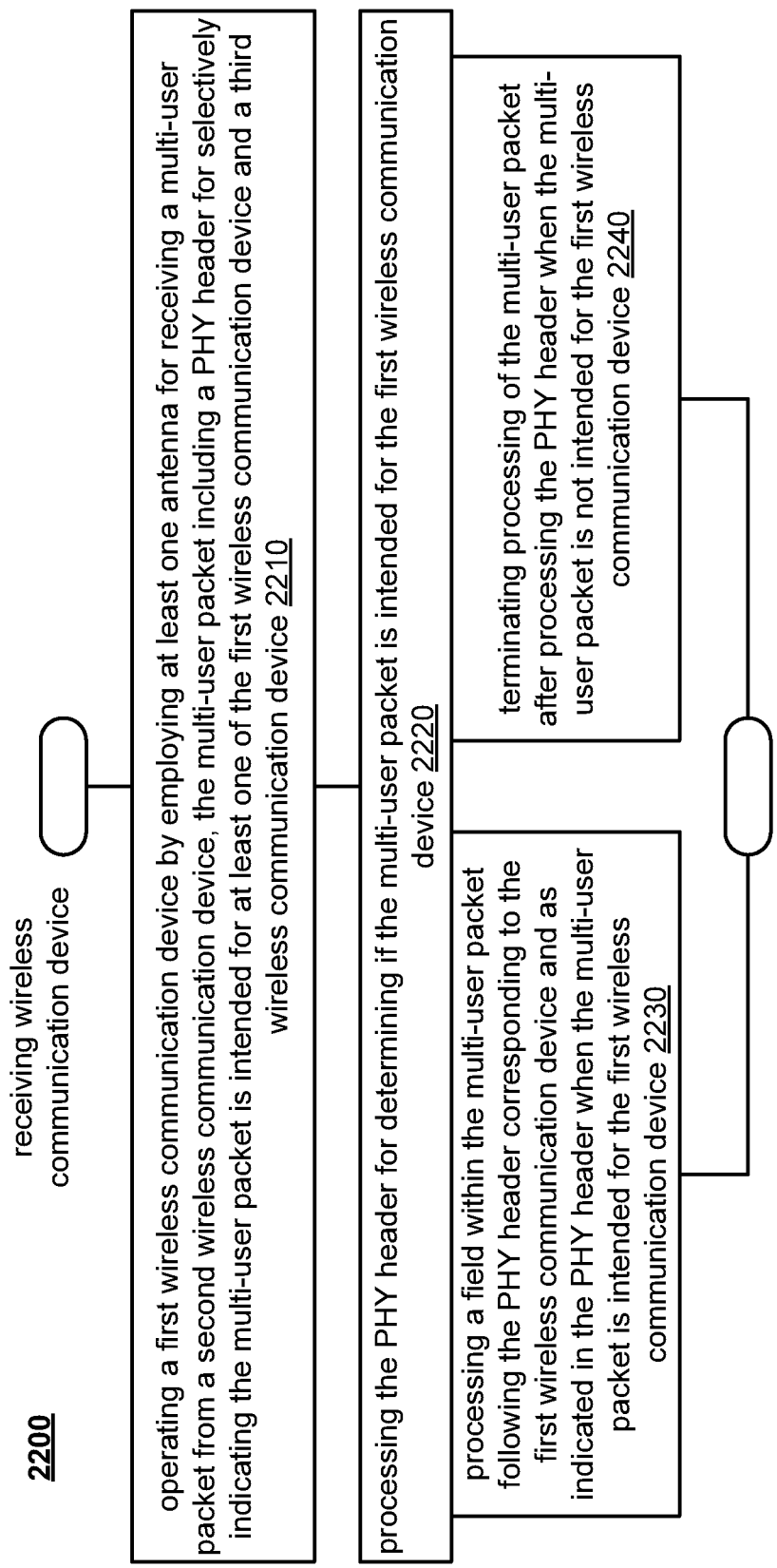
FIG. 22, FIG. 23, FIG. 24A, and FIG. 24B illustrate embodiments of methods for operating wireless communication devices.

Referring to method 2200 of FIG. 22, the method 2200 begins by operating a first wireless communication device by employing at least one antenna for receiving a multi-user packet from a second wireless communication device, the multi-user packet including a PHY header for selectively indicating the multi-user packet is intended for at least one of the first wireless communication device and another wireless communication device (e.g., a third wireless communication device), as shown in a block 2210.

The method 2200 continues by processing the PHY header for determining if the multi-user packet is intended for the first wireless communication device, as shown in a block 2220. It is of course noted that, while the generic term of multi-user packet is employed in many contexts and embodiment herein, a 'multi-user packet' may be intended for as few as a single receiving wireless communication device without departing from the scope and spirit of the invention. For example, such a 'multi-user packet' may have a format corresponding to and complying with a MU context, where such a 'multi-user packet' may be intended for a SU context. However, the generic term of multi-user packet is employed herein to describe such a packet having the characteristics, structure, etc. described herein though such a packet may be intended for as few as a single receiving wireless communication device.

The method 2200 then operates by processing a field within the multi-user packet following the PHY header and corresponding to the first wireless communication device as indicated in the PHY header when the multi-user packet is intended for the first wireless communication device, as shown in a block 2230. That is to say, when the multi-user packet is in fact intended for the first wireless communication device as based on the operations in the block 2220, the method 2200 may operate by then processing at least one particular field within the multi-user packet that is intended for the first wireless communication device. Such at least one field(s) may be indicated as well within the PHY header portion of the multi-user packet as well.

Alternatively, when the multi-user packet is not intended for the first wireless communication device as based on the operations in the block 2220, the method 2200 continues by terminating processing of the multi-user packet after processing the PHY header when the multi-user packet is not intended for the first wireless communication device, as shown in a block 2240. Such operations in accordance with the method 2200 may generally be viewed as being performed within a receiving wireless communication device (e.g., STA).

Figure 23:
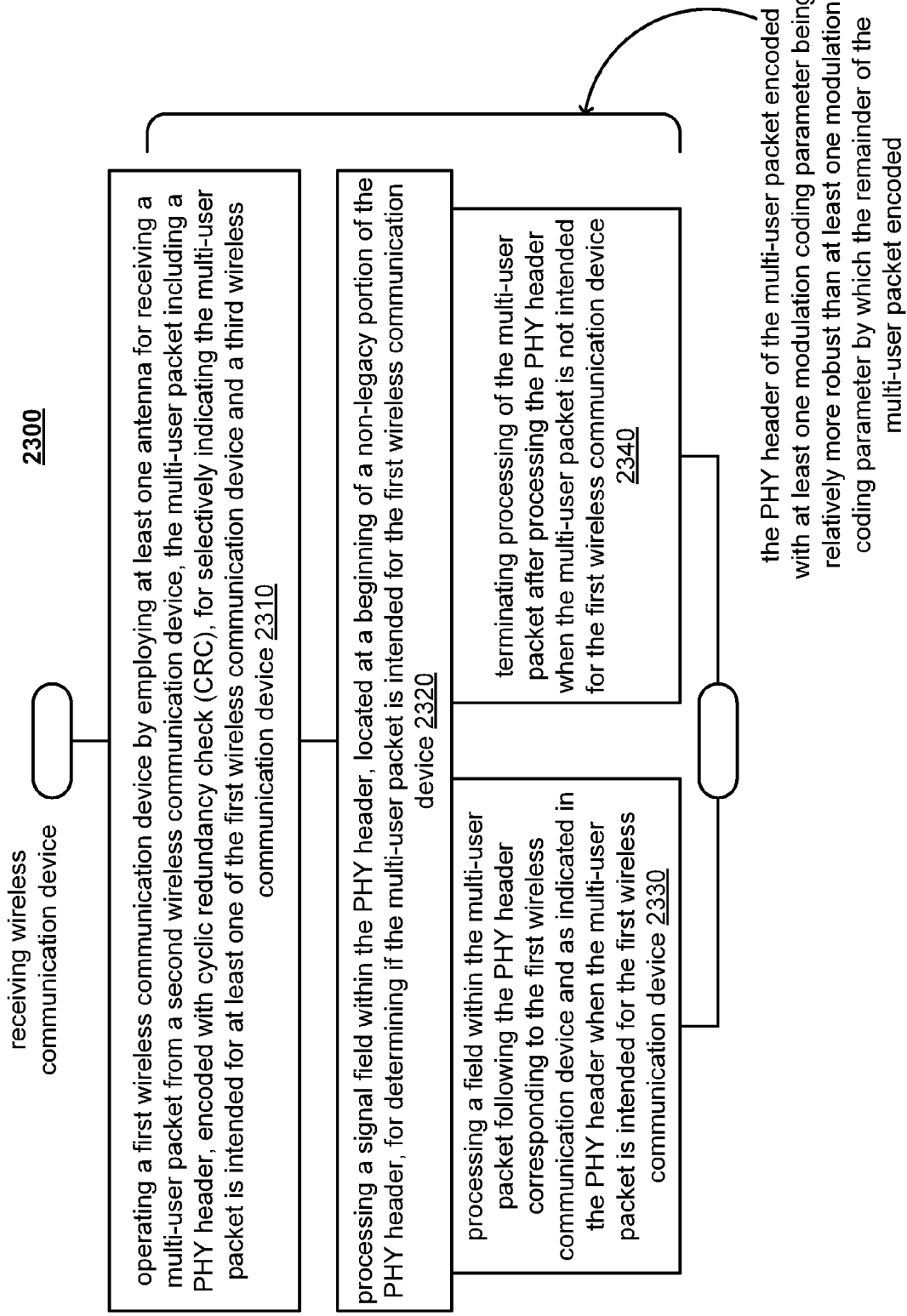

Referring to method 2300 of FIG. 23, the method 2300 begins by operating a first wireless communication device by employing at least one antenna for receiving a multi-user packet from a second wireless communication device, the multi-user packet including a PHY header, encoded with cyclic redundancy check (CRC), for selectively indicating the multi-user packet is intended for at least one of the first wireless communication device and a third wireless communication device, as shown in a block 2310.

The method 2300 continues by processing a signal field within the PHY header, located at a beginning of a non-legacy portion of the PHY header, for determining if the multi-user packet is intended for the first wireless communication device, as shown in a block 2320.

When the multi-user packet is in fact intended for the first wireless communication device as based on the operations in the block 2320, the method 2300 may operate by then processing a field within the multi-user packet following the PHY header corresponding to the first wireless communication device and as indicated in the PHY header, as shown in a block 2330.

Alternatively, when the multi-user packet is not intended for the first wireless communication device as based on the operations in the block 2320, the method 2300 continues by terminating processing of the multi-user packet after processing the PHY header, as shown in a block 2340.

In some instances, the PHY header of the multi-user packet has been encoded with at least one modulation coding parameter being relatively more robust than at least one additional modulation coding parameter by which the remainder of the multi-user packet encoded, noting that the PHY header and the remainder of the multi-user packet may be encoded with different respective operational parameters (e.g., modulations, code rates, etc.). That is to say, the PHY header has been encoded with respective parameters that are relatively more robust than those by which the remainder of the multi-user packet has been encoded. Such operations in accordance with the method 2300 may generally be viewed as being performed within a receiving wireless communication device (e.g., STA).

Figure 24:
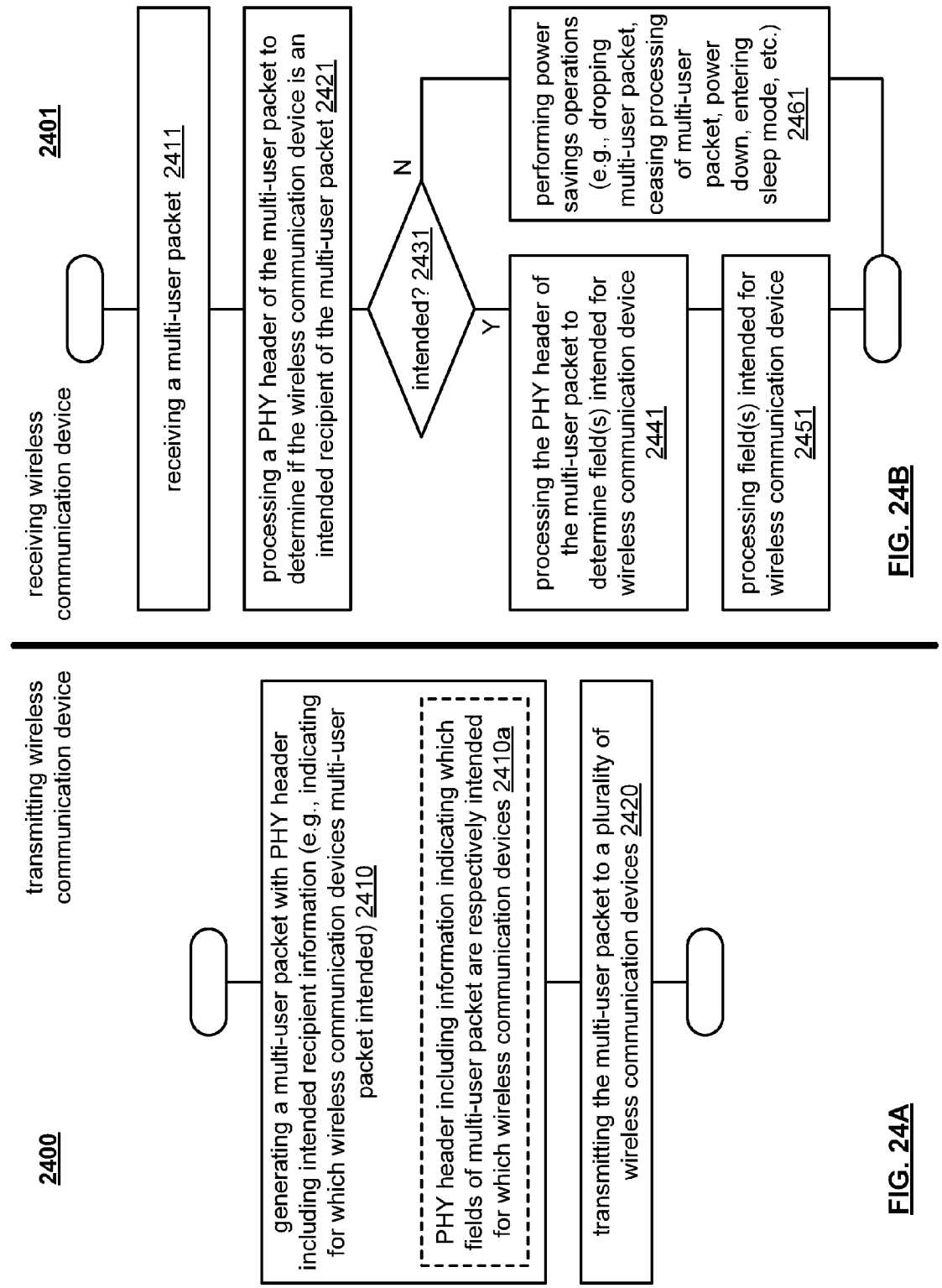

Referring to method 2400 of FIG. 24A, the method 2400 begins by generating a multi-user packet with PHY header including intended recipient information (e.g., indicating for which wireless communication devices multi-user packet intended), as shown in a block 2410. In certain embodiments, PHY header may include information indicating which fields of multi-user packet are respectively intended for which wireless communication devices, as shown in a block 2410a. The method 2400 continues by transmitting the multi-user packet to a plurality of wireless communication devices, as shown in a block 2420. Such operations in accordance with the method 2400 may generally be viewed as being performed within a transmitting wireless communication device (e.g., AP or a STA operating in accordance with AP functionality).

Referring to method 2401 of FIG. 24B, the method 2401 begins by receiving a multi-user packet, as shown in a block 2411. The method 2401 then operates by processing a PHY header of the multi-user packet to determine if the wireless communication device is an intended recipient of the multi-user packet, as shown in a block 2421. The method 2401 continues by determining if the multi-user packet is intended for the wireless communication device, as shown in a decision block 2431.

If the multi-user packet is intended for the wireless communication device, the method 2401 then operates by processing the PHY header of the multi-user packet to determine field(s) intended for wireless communication device, as shown in a block 2441. The method 2401 then continues by processing field(s) intended for wireless communication device, as shown in a block 2451.

Alternatively, if the multi-user packet is intended for the wireless communication device, the method 2401 then operates by performing power savings operations (e.g., dropping multi-user packet, ceasing processing of multi-user packet, power down, entering sleep mode, etc.), as shown in a block 2461. Such operations in accordance with the method 2401 may generally be viewed as being performed within a receiving wireless communication device (e.g., STA).

It is also noted that the various operations and functions as described with respect to various methods herein may be performed within a wireless communication device, such as using a baseband processing module implemented therein, (e.g., such as in accordance with the baseband processing module as described with reference to FIG. 2). For example, such a baseband processing module can perform such processing (e.g., either the generating and/or receive processing) of recipient list information (and/or respective field related information) of PHY header information within a packet and/or any other operations and functions as described herein, etc. or their respective equivalents.

Figure 25:
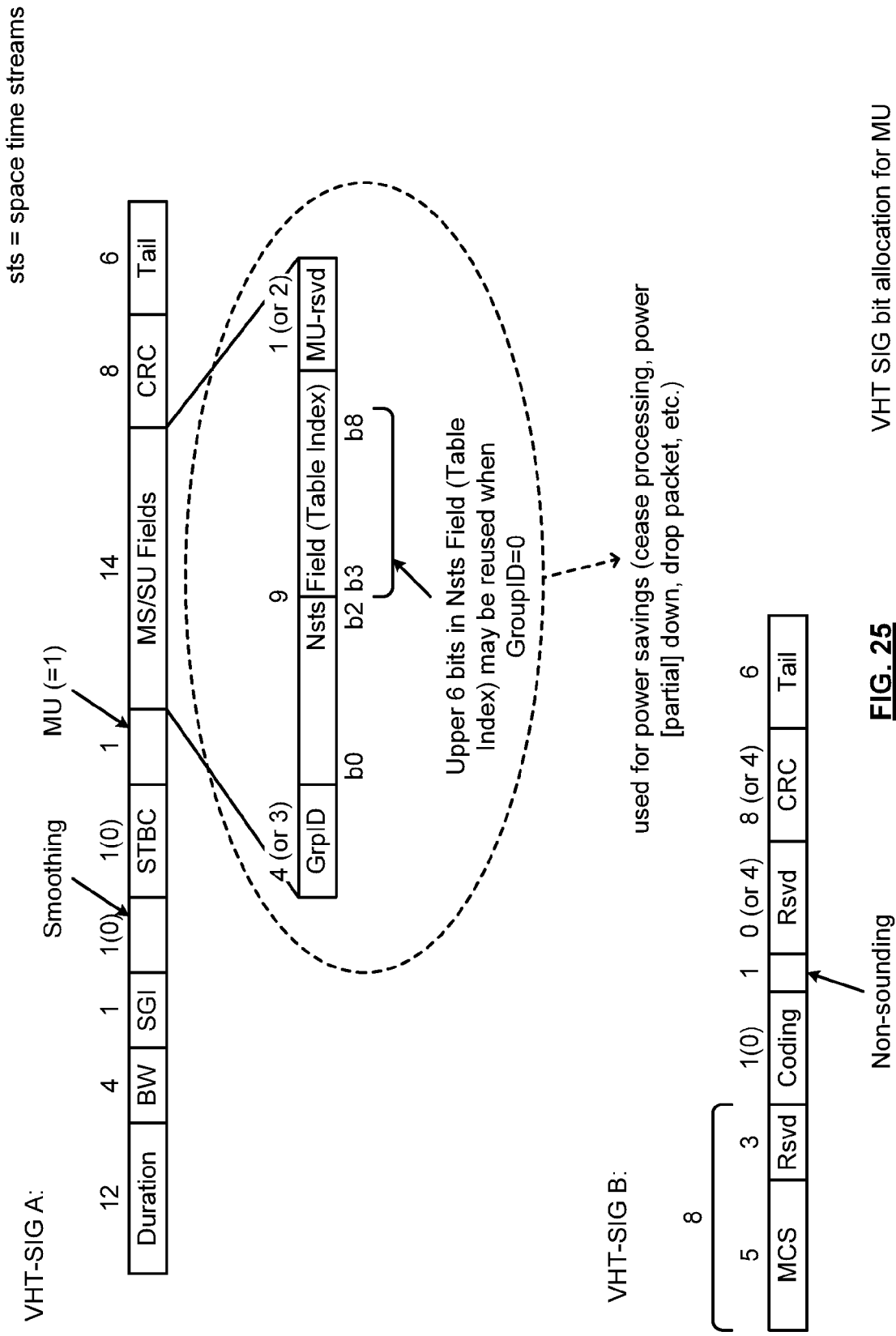
FIG. 25 is a diagram illustrating an embodiment of signal field bit allocation as may be employed within communications between wireless communication devices in accordance with multi-user (MU) applications.

FIG. 25 is a diagram illustrating an embodiment of signal field bit allocation as may be employed within communications between wireless communication devices in accordance with multi-user (MU) applications. Considering such a possible variant to signal field bit allocation, if a bit is employed therein for smoothing, it should be located in the first signal field (VHT-SIGA) to estimate the communication channel via which the packet is received with at least one VHT-LTF. In embodiments that may employ space time block coding (STBC), an STBC bit may be employed in the first signal field (VHT-SIGA). In some instances, 1 bit of STBC indication may be sufficient. The various fields such as Duration/BW/SGI/Smoothing/STBC/MU bits/GrpID (group ID) are employed to deliver common information across all users (e.g., legacy and non-legacy receiving wireless communication devices). The Nsts Table Index indicates the number of the space-time streams for each user. When a non-sounding bit is employed in the second signal field (VHT-SIGB), a transmitting wireless communication device (e.g., AP) may want to request an update of channel state information (CSI) for a only subset of the receiving wireless communication devices (e.g., STAs).

As mentioned elsewhere herein, such multi-user packets having structure and format in accordance with the principles presented herein and may be adapted for both MU and SU applications.

When operating in accordance with a MU context, resolvable or non-resolvable LTFs may be employed (more details of which are described below, and also as described in U.S. Utility patent application Ser. No. 12/796,655, entitled "Group identification and definition within multiple user, multiple access, and/or MIMO wireless communications," which has been incorporated by reference above). The use of non-resolvable LTFs may have limited usage due to channel variation, but it may have benefits in accordance with the use of short packets (e.g., less overhead).

If the non-resolvable LTFs option is desired in a particular context, implementation flexibility may be provided with a restriction that the same number of LTFs is send to all receiving wireless communication devices (e.g., STAs). For example, if the group ID=0 for non-resolvable LTFs, or a specific or predetermined value, for SU-MIMO non-resolvable LTFs, then all receiving wireless communication devices (e.g., STAs) can assume that a preamble contains a number of LTFs indicated for a first respective receiving wireless communication device (e.g., STA) (e.g., Nsts_1 determines number of LTFs). The number of LTFs may be set to be the max(LTFs over all STAs). If the actual number of space-time streams, Nsts_k, <Nsts_1 for a certain receiving wireless communication device (e.g., STA), that receiving wireless communication device (e.g., STA) may ignore the channel measured from LTFn, where n>Nsts_k and k=1, . . . , 4 users (for example).

If the non-resolvable LTFs option is desired to be allowed in a particular context so that each respective receiving wireless communication device (e.g., STA) may have a different number of LTFs, and the group ID and Nsts field may indicate how many LTFs correspond to each respective receiving wireless communication device (e.g., STA) (e.g., such as when a management frame exchange is performed).

In order to avoid any performance degradation, it may be recommended to use non-resolvable LTFs for only a limited number or types of cases. For example, non-resolvable LTFs may be limited only to applications that may get better performance gain over resolvable LTFs. Also, it is noted that, in order to make signaling more straightforward, a "resolvable LTF" bit may be included that indicates resolvable application or the non-resolvable LTFs application.

Figure 26:
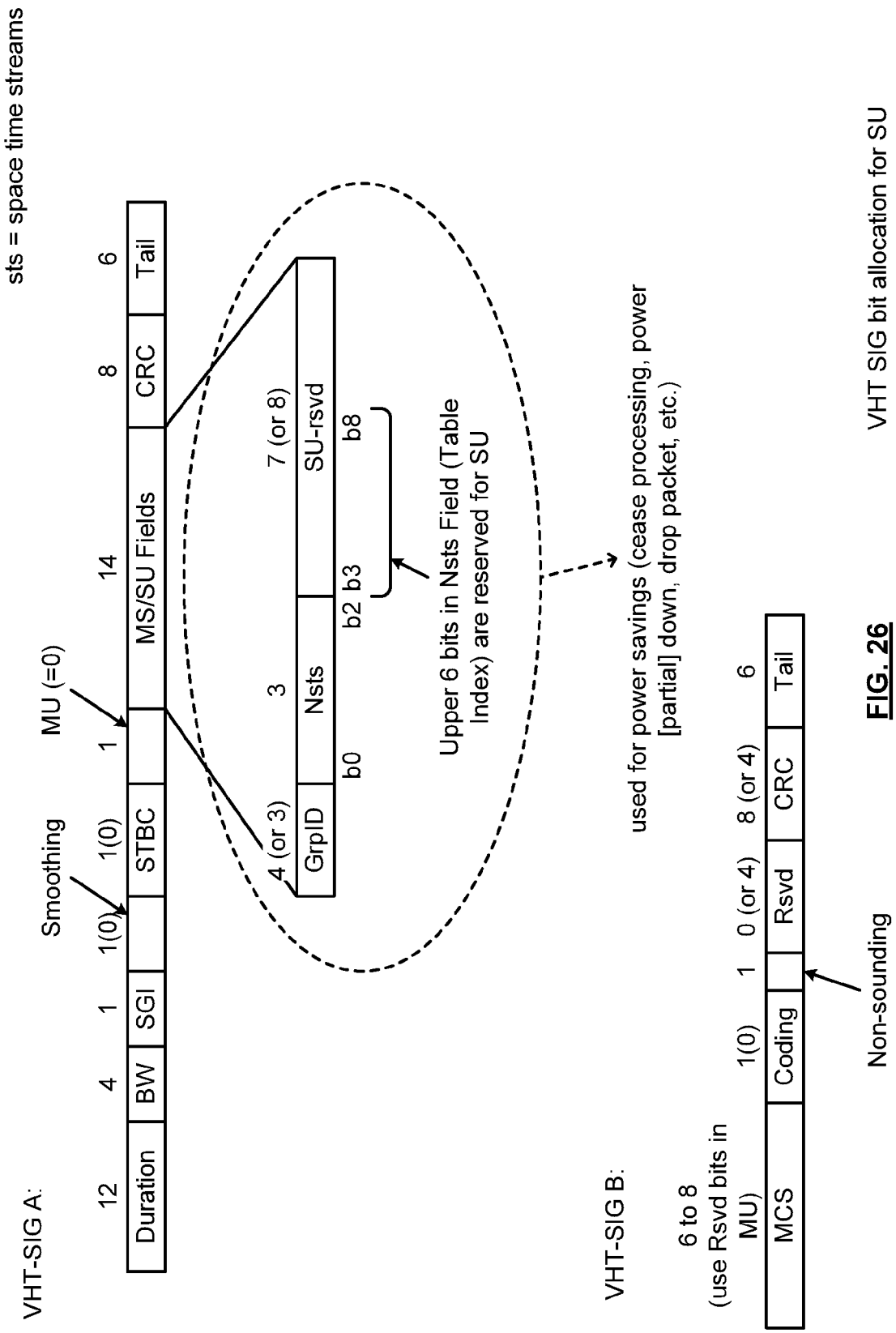
FIG. 26 is a diagram illustrating an embodiment of signal field bit allocation as may be employed within communications between wireless communication devices in accordance with single-user (SU) applications.

FIG. 26 is a diagram illustrating an embodiment of signal field bit allocation as may be employed within communications between wireless communication devices in accordance with single-user (SU) applications. As may be seen with respect to this diagram, this can have the same structure of bit allocation when compared with MU. The Nsts field determines the number of VHT-LTFs (1 to 8) using the first 3 bits in the Nsts Table Index. In the second signal field (VHT-SIGB), modulation coding set (MCS) bits may be extended to 6 (or up to 8) bits to support unequal modulation using reserved bits in MU; this will not change the definition of other bits in the second signal field (VHT-SIGB). Reserved bits in the first signal field (VHT-SIGA) may then be 7 (or 8) bits. These bits may be used for a number of applications, including using 2 more bits for STBC to cover 8 transmit antennas, and/or coding/non-sounding bits may be moved (or copied) from the second signal field (VHT-SIGB) if necessary. Alternatively, 11 bits of STA ID (SID) (by combining group ID) may be used for such applications as mentioned above.

Figure 27:
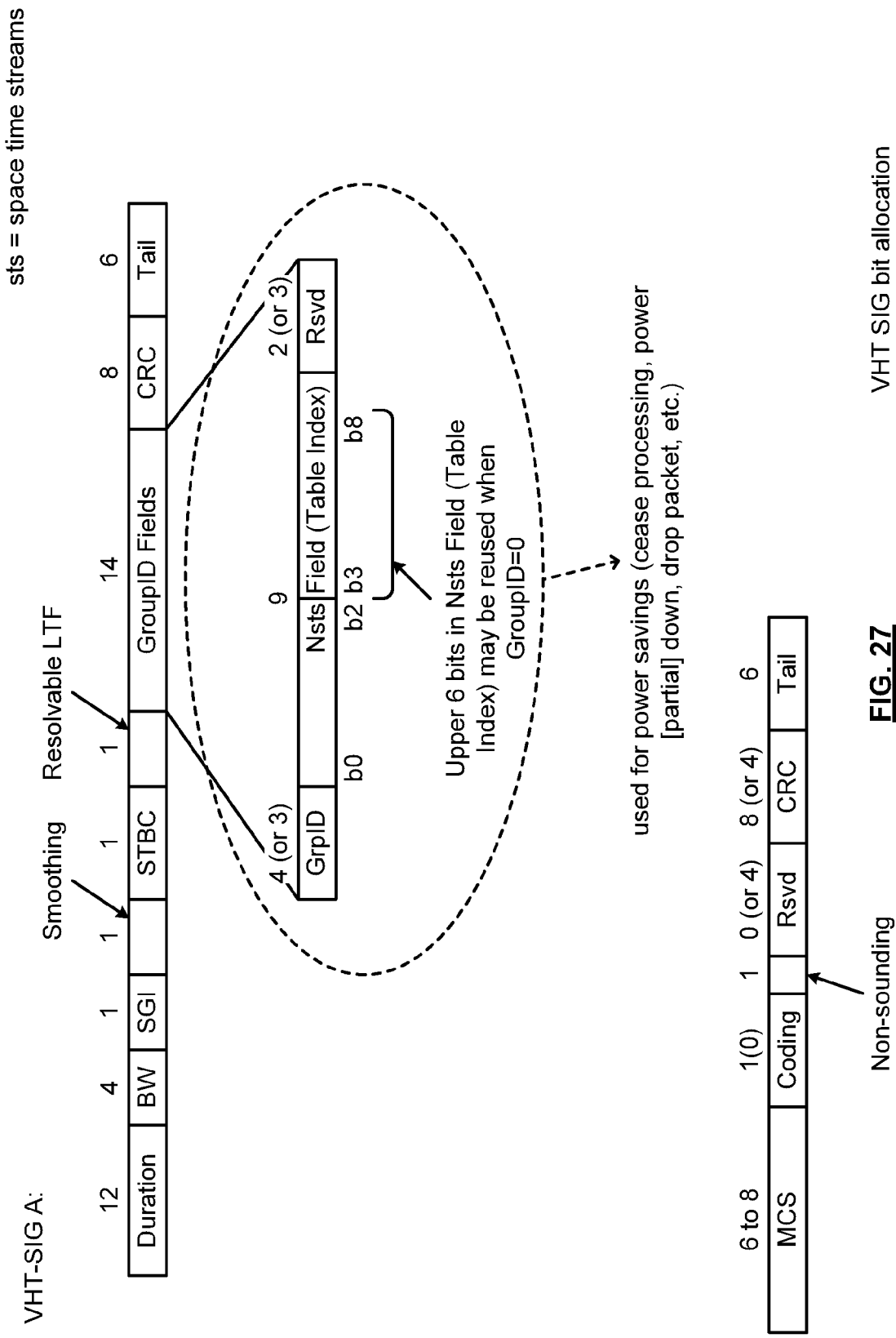
FIG. 27 is a diagram illustrating an alternative embodiment of signal field bit allocation as may be employed within communications between wireless communication devices.

FIG. 27 is a diagram illustrating an alternative embodiment of signal field bit allocation as may be employed within communications between wireless communication devices. A resolvable LTF bit in combination with Nsts field may be employed to indicate whether the packet is SU/MU with resolvable LTFs or not.

When the resolvable LTF bit in combination with Nsts field is set to 1, LTFs are resolvable, a configuration which can be used for SU-MIMO or MU-MIMO with non-resolvable LTFs; # of LTFs=sum(LTFs_k), k=1, 2, 3 and 4.

When operating in accordance with a SU-MIMO application context, the Nsts field may be as follows: Nsts=[0 8 0 0]. For example, one non-zero entry in the Nsts field indicates SU-MIMO operation. After collecting channel state information (CSI) following the transmission of a sounding/management frame, a transmitting wireless communication device (e.g., AP) may choose to operate in accordance with SU-MIMO with group ID indication in the preamble that may enable power save mode for devices that are not recipients of the packet. If the transmitting wireless communication device (e.g., AP) desires to operate in accordance with an open loop transmission (e.g., without exchange of a management frame), then group ID is set to 0, or a specific or predetermined value, and only the first 3 bits in Nsts may then be used to indicate the number of LTFs. It is noted that Nsts and number of LTFs may be related such that Nsts=3 may require 4 LTFs, in one possible embodiment. It is still possible to reuse the upper 6 bits (or 9 bits, in an alternative embodiment) in Nsts Table Index when group ID=0 (or a specific or predetermined value).

Alternatively, when operating in accordance with a MU-MIMO application context, the group ID may be used to indicate the number of valid LTFs for each respective receiving wireless communication device (e.g., STA) in the Nsts field. The group ID indication in the preamble may enable power save mode for devices that are not recipients of the packet (e.g., for those not included within the recipient list information included within the PHY header information of a packet, such as the group ID).

Power saving can be also achieved with MU-MIMO packets. When group ID is set to one of groups for MUMIMO, all the other receiving wireless communication devices (e.g., STAs) that do not belong to the specified group do not have to decode the packet further, since they detects the destination of the packet is not for them by reading the group ID. Then, they can drop the packet earlier before decoding MAC header. However, if they belong to the specified group ID, they need to decode how many of the respective streams (e.g., number of space-time streams) are assigned to them by reading Nsts field in the preamble. If there are no streams that are assigned to them, they can drop the packet earlier before decoding MAC header. Otherwise, they have to process all of the remainder packet to its end.

For example, consider an embodiment in which group ID=5 is defined for STA=[A C F E] in the order. When the packet with group ID=5 is sent, STA B does not have to decode the packet after VHT-SIGA, since it knows it does not belong to the group ID=5. Only the respective STAs A, C, F, E need to decode the packet. They read Nsts field in VHT- SIGA to determine which streams particularly to process (e.g., if Nsts=[0 3 2 0], then the number of streams assigned to STA_[A C F E] is [0 3 2 0]). In such an instance, since there is no stream assigned to STA A, STA A does not need to decode the packet further, so it drops the packet right after VHT-SIGA. The same operations may be performed for STA E. However, STA C and STA F, which have the number of streams assigned with 3 and 2, respectively, need to decode the whole packet. Therefore, all STAs except for STA C and STA F in the basic services set (BSS) do not have to decode the whole packet and can drop the packet earlier, thereby saving unnecessary power.

When the resolvable LTF bit in combination with Nsts field is set to 0, then the LTFs used for MU-MIMO are non-resolvable, and the number of LTFs=max(LTFs_k). Considering the MU-MIMO application context, group ID can be still used if a transmitting wireless communication device (e.g., AP) has such capability and if a valid number of LTFs for each respective receiving wireless communication device (e.g., STA) is indicated in the Nsts field (e.g., after the SIGA field after group ID). Again, PHY header information such as a group ID indication in the preamble may enable power save mode for those receiving wireless communication devices (e.g., STAs) that are not recipients of the packet. If the transmitting wireless communication device (e.g., AP) does not have such capability (e.g., group ID), then the group ID may be set to 0, and only the first 3 bits in the Nsts field are used to indicate the number of LTFs. Again, it is still possible to reuse the upper 6 bits in Nsts Table Index when the group ID=0 (or specific or predetermined value).

When operating in accordance with a SU-MIMO application context based on this variant, when a recipient wireless communication device (e.g., STA) is not in the list of any group ID (e.g., when operating in accordance with an open loop mode without a management frame exchange, such as when group ID=0, or specific or predetermined value). When the resolvable LTF bit is set to 1 (e.g., in order to distinguish from non-resolvable LTFs for MU-MIMO), then only the bits, b0 to b2, in Nsts field are used, and an extra 6 bits (or 9 bits, in an alternative embodiment) are available for an alternative use or new definition.

However, when a recipient wireless communication device (e.g., STA) is in the list of a group ID, then the resolvable LTF bit=1 (or 0). In such an embodiment, a non-zero group ID and all 9 bits (or 12 bits) in the Nsts field may be used to indicate the number of streams for up to 4 users, but only one Nsts_k is non-zero.

When operating in accordance with a MU-MIMO application context based on this variant, when non-resolvable LTFs are being used (e.g., the resolvable LTF bit=0), then if the group ID is non-zero, all 9 bits (or 12 bits) in the Nsts field are used, and the number of VHT-LTFs in the PHY header is equal to Max_k(LTFs_k), where k=1, 2, 3, 4. Each respective receiving wireless communication device (e.g., STA) still knows the exact Nsts field for itself (e.g., by detecting Nsts_k). If group ID=0 (or specific or predetermined value), only b0~b2 in Nsts field are used to indicate the number of space-time streams directed toward the recipient in the transmission leaving an extra 6 bits (or 9 bits, in an alternative embodiment) available for an alternative use or new definition.

When operating in accordance with a MU-MIMO application context based on this variant, the resolvable LTFs are used (e.g., resolvable LTF bit=1), and if a non-zero group ID is indicated then all 9 bits (or 12 bits) in the Nsts field are used to indicate he number os space-time streams directed towards each recipient in this transmission, and the number of VHT-LTFs=sum(LTFs_k), where k varies from k=0 to k=n, where n is the number of receiving wireless communication devices (e.g., STAs) included within the intended recipient list for the MU transmission.

It is noted that a non-zero group ID can be used to AID in power saving for non-recipient STAs through early packet drop. Also, in order to make signaling more straightforward, a MU bit may be included that indicates whether the particular packet corresponds to a MU or SU application.

Figure 28:
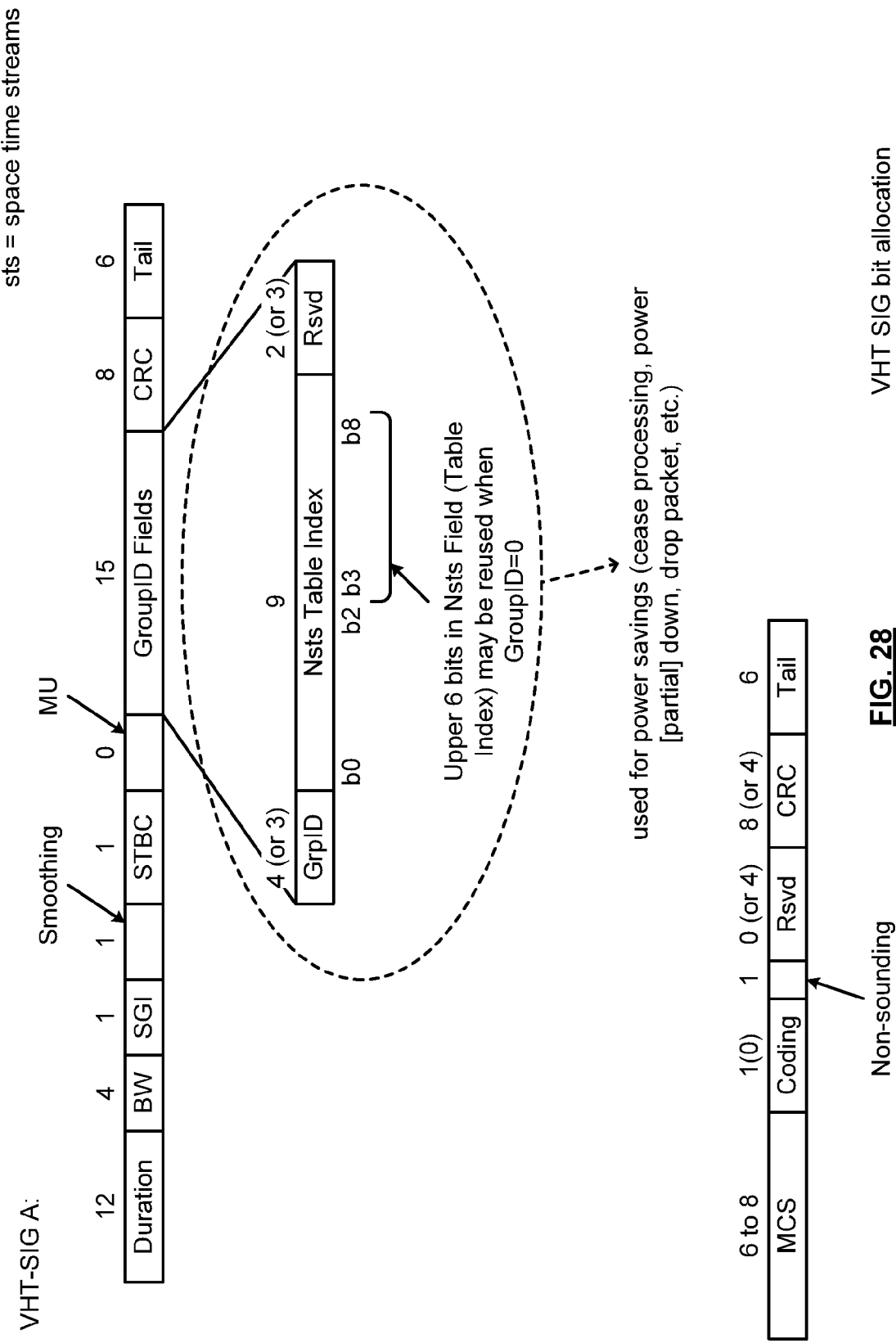
FIG. 28 is a diagram illustrating yet another alternative embodiment of signal field bit allocation as may be employed within communications between wireless communication devices.

FIG. 28 is a diagram illustrating yet another alternative embodiment of signal field bit allocation as may be employed within communications between wireless communication devices. This embodiment does not include the MU indication bit (such as is included in other embodiments herein). Nonetheless, another option may be employed to indicate whether the particular packet corresponds to a MU or SU application, such as using the Nsts field.

For example, if the Nsts field includes only one non-zero entry (e.g., Nsts=[0 8 0 0]), then the packet actually corresponds to a SU-MIMO application. After collecting CSI by employing a sounding/management frame with a non-zero group ID, a transmitting wireless communication device (e.g., AP) may choose to operate in accordance with SU-MIMO with the same group ID (e.g., such as may be used for power saving purposes) and then by providing only one non-zero entry in the Nsts field as described above. If the transmitting wireless communication device (e.g., AP) desires to operate in accordance with an open loop transmission scheme, the management frame can be sent without requesting CSI feedback and a non-zero group ID field may be included in the preamble of the transmitted packet.

For Non-resolvable LTFs employed in accordance with a MU application or in accordance with an open loop SU application operating without a management frame exchange, the group ID may be set to 0 and the first 3 bits in Nsts may be used to indicate the number of LTFs so that it is possible to allocate the upper 6 bits (or 9 bits, in an alternative embodiment) in the Nsts Table Index to indicate a partial MAC address for SU-MIMO and these bits can then be used to enhance the ability of listening STAs to save power.

As may be seen in accordance with the various principles and aspects of the invention, one unified format of bit definition for SU and MU-MIMO may be employed with a slight bit definition change. Even with respect to the SU-MIMO or non-resolvable LTFs MU case, group ID (or SID) may be used to save power for STAs.

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

| | | | | 2.4 GHz, 20/22 MHz channel BW, 54 Mbps max bit rate | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for operating a first wireless communication device, the method comprising:

employing a wireless transceiver for sending a group definition to a second wireless communication device, the group definition including a group identifier and a plurality of associate identifiers corresponding to a plurality of devices of a group, wherein the second wireless communication device determines inclusion in the group by determining that an associate identifier corresponding to the second wireless communication device is included in the plurality of associate identifiers corresponding to the plurality of devices of the group, wherein a position of device specific data associated with the second wireless communication device is indicated, based on the plurality of associate identifiers included in the group definition; and employing the wireless transceiver for sending a multi-user packet to the second wireless communication device at a time subsequent to sending the group definition, the multi-user packet including a PHY (physical layer) header having a group identification field (group ID field) that includes the group identifier.

2. The method of claim 1, wherein:
the multi-user packet being a multi-user multiple input multiple output (MU-MIMO) packet or an orthogonal frequency division multiple access (OFDMA) packet.

3. The method of claim 1, wherein the group definition includes the plurality of associate identifiers in an order.

4. The method of claim 3 wherein the position of the device specific data associated with the second wireless communication device is determined based on the order of the plurality of associate identifiers in the group definition.

5. The method of claim 1, wherein the device specific data includes a training field.

6. The method of claim 5 wherein the training field is a long training field.

7. The method of claim 1, wherein:
the PHY header of the multi-user packet is encoded with at least one modulation coding parameter being relatively more robust than at least one additional modulation coding parameter by which a remainder of the multi-user packet is encoded.

8. The method of claim 7, wherein:
the at least one modulation coding parameter including a first code rate;
the at least one additional modulation coding parameter including a second code rate; and
the first code rate being lower than the second code rate.

9. The method of claim 7, wherein:
the at least one modulation coding parameter including a first modulation;
the at least one additional modulation coding parameter including a second modulation; and
the first modulation different from the second modulation.

10. The method of claim 1, wherein:
the PHY header of the multi-user packet is encoded with cyclic redundancy check (CRC).

11. An access point comprising:
a wireless receiver; a wireless transmitter coupled to the wireless receiver and configured to send a group definition to a mobile communication device, the group definition including a group identifier and a plurality of associate identifiers corresponding to a plurality of devices of a group, wherein the mobile communication device determines inclusion in the group by determining that an associate identifier corresponding to the mobile communication device is included in the plurality of associate identifiers corresponding to the plurality of devices of the group, wherein a position of device specific data associated with the mobile communication device is indicated, based on the plurality of associate identifiers included in the group definition;

wherein the wireless transmitter is further configured to send a multi-user packet to the mobile communication device at a time subsequent to sending the group definition, the multi-user packet including a PHY (physical layer) header having a group identification field (group ID field) that includes the group identifier.

12. The access point of claim 11, wherein:
the multi-user packet being a multi-user multiple input multiple output (MU-MIMO) packet or an orthogonal frequency division multiple access (OFDMA) packet.

13. The access point of claim 11, wherein the group definition includes the plurality of associate identifiers in an order.

14. The access point of claim 13 wherein the position of the device specific data associated with the mobile communication device is determined based on the order of the plurality of associate identifiers in the group definition.

15. The access point of claim 11, wherein the device specific data includes a training field.

16. The access point of claim 15 wherein the training field is a long training field.

17. The access point of claim 11, wherein:
the PHY header of the multi-user packet is encoded with at least one modulation coding parameter being relatively more robust than at least one additional modulation coding parameter by which a remainder of the multi-user packet is encoded.

18. The access point of claim 17, wherein:
the at least one modulation coding parameter including a first code rate;
the at least one additional modulation coding parameter including a second code rate; and
the first code rate being lower than the second code rate.

19. The access point of claim 17, wherein:
the at least one modulation coding parameter including a first modulation;
the at least one additional modulation coding parameter including a second modulation; and
the first modulation different from the second modulation.

20. An access point comprising:
a wireless receiver; a wireless transmitter coupled to the wireless receiver and configured to send a group definition to a mobile communication device, the group definition including a group identifier and a plurality of associate identifiers corresponding to a plurality of devices of a group in an order, wherein the mobile communication device determines inclusion in the group by determining that an associate identifier corresponding to the mobile communication device is included in the plurality of associate identifiers corresponding to the plurality of devices of the group, wherein a position of a training field associated with the mobile communication device is indicated, based on the order of the plurality of associate identifiers included in the group definition;

wherein the wireless transmitter is further configured to send a multi-user packet to the mobile communication device at a time subsequent to sending the group definition, the multi-user packet including a PHY (physical layer) header having a group identification field (group ID field) that includes the group identifier.

* * * * *